US009843371B2

(12) United States Patent
Nammi et al.

(10) Patent No.: US 9,843,371 B2
(45) Date of Patent: Dec. 12, 2017

(54) PRECODING CODEBOOK BITMAPS IN TELECOMMUNICATIONS

(71) Applicant: Telefonaktiebolaget L M Ericsson (publ), Stockholm (SE)

(72) Inventors: Sairamesh Nammi, Kista (SE); Namir Lidian, Solna (SE); Nianshan Shi, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 199 days.

(21) Appl. No.: 14/421,365

(22) PCT Filed: Aug. 13, 2013

(86) PCT No.: PCT/SE2013/050966
§ 371 (c)(1),
(2) Date: Feb. 12, 2015

(87) PCT Pub. No.: WO2014/027947
PCT Pub. Date: Feb. 20, 2014

(65) Prior Publication Data
US 2015/0207552 A1 Jul. 23, 2015

Related U.S. Application Data

(60) Provisional application No. 61/796,023, filed on Nov. 1, 2012, provisional application No. 61/683,665, filed on Aug. 15, 2012.

(51) Int. Cl.
*H04B 7/04* (2017.01)
*H04B 7/0413* (2017.01)
(Continued)

(52) U.S. Cl.
CPC ......... *H04B 7/0478* (2013.01); *H04B 7/0413* (2013.01); *H04B 7/0456* (2013.01);
(Continued)

(58) Field of Classification Search
CPC .. H04B 7/0456; H04B 7/0478; H04B 7/0634; H04B 7/0486; H04B 7/0413;
(Continued)

(56) References Cited

U.S. PATENT DOCUMENTS

2005/0026623 A1* 2/2005 Fisher ................ H04W 16/10
455/452.2
2011/0013563 A1* 1/2011 Sivanesan ............ H04B 7/0417
370/328
(Continued)

FOREIGN PATENT DOCUMENTS

WO 2009025619 A2 2/2009
WO 2011042040 A1 4/2011
(Continued)

OTHER PUBLICATIONS

3GPP, "3rd Generation Partnership Project; Technical Specification Group Radio Access Network; UTRAN Iub interface Node B Application Part (NBAP) signalling (Release 11)", 3GPP TS 25.433 V11.2.0, Sep. 2012, 1-1293.
(Continued)

*Primary Examiner* — Michael Thier
*Assistant Examiner* — Rownak Islam
(74) *Attorney, Agent, or Firm* — Murphy, Bilak & Homiller, PLLC

(57) ABSTRACT

A base station node (28) communicates over a radio interface (32) with a wireless terminal (30). The base station node (28) comprises a controller (60) which, upon basis of channel feedback received from the wireless terminal, is configured to make a precoding codebook bitmap decision (3-3) regarding a precoding codebook bitmap affecting transmissions between the base station (28) and the wireless terminal (30). The base station (28) is further configured to communicate the precoding codebook bitmap decision so
(Continued)

that the precoding codebook bitmap decision may be implemented by the wireless terminal (30). In example embodiments and modes the base station (28) sends the precoding codebook bitmap decision using a bitmap decision signal to a radio network controller (26).

8 Claims, 10 Drawing Sheets

(51) Int. Cl.
  *H04B 7/0456* (2017.01)
  *H04B 7/06* (2006.01)
  *H04W 72/04* (2009.01)

(52) U.S. Cl.
  CPC ......... *H04B 7/0486* (2013.01); *H04B 7/0619* (2013.01); *H04B 7/0634* (2013.01); *H04B 7/0645* (2013.01); *H04B 7/0658* (2013.01); *H04B 7/0697* (2013.01); *H04W 72/042* (2013.01); *H04W 72/0406* (2013.01); *H04W 72/0453* (2013.01)

(58) Field of Classification Search
  CPC .. H04B 7/0632; H04B 7/0697; H04B 7/0658; H04B 7/0619; H04B 7/0621; H04B 7/0645; H04W 72/042; H04W 72/0406; H04W 72/0453; H04W 72/04
  USPC ....................................................... 370/281
  See application file for complete search history.

(56) References Cited

U.S. PATENT DOCUMENTS

| | | | |
|---|---|---|---|
| 2011/0075746 A1 | 3/2011 | Rheinschmitt et al. | |
| 2011/0080969 A1* | 4/2011 | Jongren | H04B 7/0417 375/267 |
| 2011/0200132 A1* | 8/2011 | Kim | H04B 7/0413 375/267 |
| 2011/0243098 A1 | 10/2011 | Koivisto et al. | |
| 2013/0022021 A1* | 1/2013 | Wild | H04B 7/0639 370/330 |
| 2013/0215992 A1* | 8/2013 | Kazmi | H04B 7/0413 375/295 |

FOREIGN PATENT DOCUMENTS

| | | |
|---|---|---|
| WO | 2012026868 A1 | 3/2012 |
| WO | 2014027949 A2 | 2/2014 |
| WO | 2014027949 A3 | 4/2014 |

OTHER PUBLICATIONS

3GPP, "3rd Generation Partnership Project; Technical Specification Group Radio Access Network; UTRAN Iub/Iur interface user plane protocol for DCH data streams (Release 11)", 3GPP TS 25.427 V11.0.0, Dec. 2011, 1-48.
Unknown, Author, "4-branch MIMO for HSDPA", 3GPP TSG RAN WG1 Meeting #65, R1-111763, Source: Ericsson, Barcelona, Spain, May 9-13, 2011, 1-17.
Unknown, Author, "Precoding Codebook Design for Four branch MIMO System", 3GPP TSG-RAN WG1 #68bis, R1-121761, Ericsson, Jeju, South Korea, Mar. 26-30, 2012, 1-14.

\* cited by examiner

PRECODING CODEBOOK BITMAPS IN TELECOMMUNICATIONS

This application claims the priority and benefit of the following United States Provisional Patent Applications, both of which are incorporated herein by reference in their entireties: (1) U.S. Provisional Patent Application 61/683,665, filed Aug. 15, 2012, entitled "IMPLEMENTING CODEBOOK SUBSET RESTRICTIONS IN HIGH SPEED DOWNLINK PACKET ACCESS SYSTEMS"; and (2) U.S. Provisional Patent Application 61/796,023, filed Nov. 1, 2012, entitled "PRECODING CODEBOOK BITMAPS IN TELECOMMUNICATIONS".

TECHNICAL FIELD

This invention pertains to telecommunications, and particularly to use of codebooks for precoders and communication of such codebooks among nodes of a telecommunications system.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. For example, specifications for the Evolved Universal Terrestrial Radio Access Network (E-UTRAN) have been developed within the 3$^{rd}$ Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

Another result of the forum's work is the High Speed Downlink Packet Access (HSDPA). In HSDPA multiple users provide data to a high speed channel (HSC) controller that functions as a high speed scheduler by multiplexing user information for transmission over the entire HS-DSCH bandwidth in time-multiplexed intervals (called transmission time intervals (TTI)). HSDPA achieves higher data speeds by shifting some of the radio resource coordination and management responsibilities to the base station from the radio network controller. Those responsibilities include one or more of the following: shared channel transmission, higher order modulation, link adaptation, radio channel dependent scheduling, and hybrid-ARQ with soft combining.

Several new features have been added for the long term High Speed Packet Access (HSPA) evolution in order to meet the requirements set by the International Mobile Telecommunications Advanced (IMT-A). The main objective of these new features is to increase the average spectral efficiency. One possible technique for improving downlink spectral efficiency is to introduce support for four branch multiple input multiple output (MIMO), e.g., utilize up to four transmit and receive antennas to enhance the spatial multiplexing gains and to offer improved beamforming capabilities. Four branch MIMO provides up to 84 Mbps per 5 MHz carrier for high signal to noise ratio (SNR) users and improves the coverage for low SNR users.

In a MIMO transmission system information-carrying symbol vectors s are multiplied by an $N_T \times r$ precoder matrix $W_{N_T \times r}$. The matrix is often chosen to match the characteristics of the $N_R \times N_T$ MIMO channel matrix H. Each of the r symbols in vector s corresponds to a layer and r is referred to as the transmission rank. The precoder $W_{N_T \times r}$ may be selected from a predetermined and finite set of countable precoders known to both the base station as well as the UE, a so-called codebook. This restricts the base station in the choice of precoder and is usually coupled with feedback reporting from the UE which recommends a precoder to the eNodeB.

Ideal linear precoding requires full channel state information (CSI) at the transmitter, which may be possible only for time division duplex (TDD)-based systems but not practical for frequency division duplex (FDD)-based systems. Codebook-based precoding allows the receiver to explicitly identify a precoding matrix/vector based on a codebook that should be used for transmission.

In 3GPP LTE standard, separate codebooks are defined for various combinations of the number of transmit antennas and the number of transmission layers. The latter is also called rank information or rank indicator (RI). For example, for four transmit antennas a total of sixty four precoding vectors and matrices are defined. Also for each rank in the codebook for the scenarios of RI=1, 2, 3, and 4, there are sixteen elements per rank are defined. The 3GPP standard does not specify what criteria the UE should use to compute the RI and/or the optimum precoding matrices/vectors. FIG. 1 shows the message sequence chart between a base station and UE.

The UE estimates the channel state information such as RI/PCI/CQI based on the pilot channel symbols. This information is sent to the NodeB via a feedback channel (e.g., HS-DPCCH). Once this information is received, a scheduler at the NodeB decides which modulation, coding scheme, PCI and RI is to be used for the data traffic channel. This information is sent to the UE via a downlink control channel, and data transmission starts thereafter.

The current HSDPA system (Release 7-1) supports 1 or 2 transmit antennas at the Node-B. For these systems, from channel sounding, a UE measures the channel and reports the channel state information in one sub frame. Typically this report consists of a channel quality indicator (CQI) which explicitly indicates Rank indicator (RI), and a pre-coding control indicator (PCI). The UE sends this report periodically for every subframe (TTI). Once the Node-B receives this report it grants the modulation and coding, number of codes, rank and the precoding channel indicator to each specific UE based on the scheduler metric.

Currently a 4Tx transmissions scheme for HSDPA is being discussed in 3GPP. One issue extensively discussed for 3GPP is design of a precoding codebook. It has been decided to use a codebook with 16 elements for each rank. In this regard, see, e.g. R1-121761, Precoding Codebook Design for Four Branch MIMO System, Mar. 26-30, 2012, which is incorporated herein by reference in its entirety.

In general the NodeB has no control in selection of rank/precoding index/CQI reported by the UE. Moreover, in some cases, the UE feedback information is not useful for the NodeB. As an example, the NodeB may not have the appropriate power and/or codes for which to schedule the user in accordance with the UE rank information. In other instances, the NodeB has the capability to schedule the users with certain precoder elements. But in these cases the NodeB must inform the UE, regarding what rank information the NodeB prefers, what precoder elements the NodeB does not prefer, etc.

One method in coordinating selection of transmission parameters involves introduction of a codebook subset restriction in which the network (e.g., RNC) sends the bitmap to the UE through a higher order signaling (RRC) during the cell set up. The UE uses this bitmap when reporting the channel state information. An implementation of such method is described in detail in U.S. Provisional Patent application No. 61/683,665 "IMPLEMENTING CODEBOOK SUBSET RESTRICTIONS IN HIGH SPEED DOWNLINK PACKET ACCESS SYSTEMS, which is incorporated herein by reference in its entirety. More specifically, in an implementation of codebook subset restriction a UE is restricted to report PCI and RI within a precoder codebook subset specified by a bitmap parameter codebook-SubsetRestriction configured by higher layer signaling. This information is sent through RRC signaling during the cell setup. The bitmap can specify all possible precoder codebook subsets from which the UE can assume the NodeB may be using when the UE is configured. The bitmap forms the bit sequence $a_{63}, \ldots, a_3, a_2, a_1, a_0$ where $a_0$ is the LSB and $a_{63}$ is the MSB and where a bit value of zero indicates that the PCI reporting is not allowed to correspond to precoder(s) associated with the bit. FIG. 2 shows an example message sequence which sets up this implementation of codebook subset restriction operation.

There are problems, however, with such an implementation of a codebook subset restriction solution. For example, once the bitmap sent to the UE, there is no mechanism whereby the RNC can change the bitmap. Thus, the full benefits of the codebook subset restriction functionality are not obtained.

SUMMARY

The technology disclosed herein provides apparatus and methods for facilitating change of a bitmap changed in codebook subset restriction. In an example embodiment the technology disclosed herein introduces new signaling between a NodeB and a radio network controller (RNC). Providing change in codebook subset restriction improves system performance by good link adaptation while at the same time reduce the complexity at the wireless terminal.

In one of its aspects, the technology disclosed herein concerns a method of operating a telecommunications network, and a method of operating a base station node. The method comprises receiving channel feedback at the base station node from a wireless terminal; making a precoding codebook bitmap decision regarding a precoding codebook bitmap affecting transmissions between the base station and the wireless terminal; and communicating the precoding codebook bitmap decision so that the precoding codebook bitmap decision may be implemented by the wireless terminal. In example embodiments and modes communicating the precoding codebook bitmap decision involves sending a bitmap decision signal to a radio network controller (RNC).

In other of its aspects the technology disclosed herein also concerns a base station node which communicates over a radio interface with a wireless terminal. The base station node comprises a controller which, upon basis of channel feedback received from the wireless terminal, is configure to make a precoding codebook bitmap decision regarding a precoding codebook bitmap affecting transmissions between the base station and the wireless terminal. The base station is further configured to communicate the precoding codebook bitmap decision so that the precoding codebook bitmap decision may be implemented by the wireless terminal. In example embodiments and modes the base station sends the precoding codebook bitmap decision using a bitmap decision signal to a radio network controller (RNC).

In one of its aspects the technology disclosed herein concerns a method in a radio access network. The method comprises a base station making a determination to change a precoding codebook bitmap used by a wireless terminal to report parameters to the base station; and as a result of the determination, a node of the radio access network sending a changed precoding codebook bitmap to the wireless terminal.

In an example embodiment and mode of the method in the radio access network, the parameters comprise a rank indicator (RI) and precoding control indicator (PCI).

In an example embodiment and mode of the method in the radio access network, the method in the radio access network further comprises the base station node signaling precoding codebook bitmap change information to a radio network controller in a bitmap decision signal; and upon receiving the bitmap decision signal, the radio network controller serving as the radio access network node that sends the changed precoding codebook bitmap to the wireless terminal.

In an example embodiment and mode of the method in the radio access network, the precoding codebook bitmap change information comprises an entire bitmap as changed as a result of the determination of the base station.

In an example embodiment and mode of the method in the radio access network, the precoding codebook bitmap change information comprises a subset of a bitmap as changed as a result of the determination of the base station.

In an example embodiment and mode of the method in the radio access network, the precoding codebook bitmap change information comprises an instruction for indicating which bits of a bitmap are to be changed as a result of the determination of the base station.

In an example embodiment and mode of the method in the radio access network, the bitmap decision signal comprises NodeB Application Part (NBAP) signaling.

In an example embodiment and mode of the method in the radio access network, the bitmap decision signal comprises an information element included in a message sent from the base station to the radio network controller.

In an example embodiment and mode, the method in the radio access network further comprises including the information element in a PHYSICAL SHARED CHANNEL RECONFIGURATION RESPONSE message.

In an example embodiment and mode, the method in the radio access network further comprises including the information element in at least one of the following messages: NBAP/RNSAP "RADIO LINK SETUP RESPONSE message; RADIO LINK ADDITION RESPONSE message; RADIO LINK RECONFIGURATION READY message; and a RADIO LINK RECONFIGURATION RESPONSE message.

In an example embodiment and mode, the method in the radio access network further comprises including the information element in at least one of the following messages: HS-DSCH Information Response message; and HS-DSCH FDD Secondary Serving Information Response message.

In an example embodiment and mode, the method in the radio access network further comprises including the information element in a RADIO LINK PARAMETER UPDATE INDICATION message.

In an example embodiment and mode, the method in the radio access network further comprises including the information element in a Iub/Iur data or control frame.

In an example embodiment and mode, the method in the radio access network further comprises the base station making the determination in conjunction with at least one of a cell setup procedure, a cell reconfiguration procedure, a physical shared channel setup procedure, and a physical shared channel reconfiguration procedure.

In an example embodiment and mode, the method in the radio access network further comprises the base station making the determination when at least one of the following occurs: a dedicated radio link is setup; a dedicated radio link is added; and dedicated radio link is reconfigured.

In an example embodiment and mode, the method in the radio access network further comprises the base station using feedback information from the wireless terminal to make the determination; and, the base station selecting sending the changed precoding codebook bitmap during a connection with the wireless terminal. In an example embodiment and mode, the method in the radio access network further comprises the base station making the determination when the feedback information indicates at least one of the following: a change in location of the wireless terminal; a change in speed of the wireless terminal; a specified rank indicator and a predetermined level of packet filling of packets in the connection.

In an example embodiment and mode, the method in the radio access network further comprises the radio network controller sending the changed precoding codebook bitmap in at least one of the following messages: an ACTIVE SET UPDATE message (in case the UTRAN needs to add, replace or delete radio links in the active set of the UE); a CELL UPDATE CONFIRM message; a PHYSICAL CHANNEL RECONFIGURATION message; a RADIO BEARER RECONFIGURATION message; a RADIO BEARER RELEASE message; a RADIO BEARER SETUP message; and a TRANSPORT CHANNEL RECONFIGURATION message.

In an example embodiment and mode, the base station is the node of the radio access network that sends the changed precoding codebook bitmap to the wireless terminal.

In another of its aspects the technology disclosed herein concerns a base station of a radio access network. The base station comprises: an interface and a processor. The interface is configured for wireless communications with a wireless terminal served by the base station. The processor is configured to make a determination to change a precoding codebook bitmap used by the wireless teeerminal to report parameters to the base station and, as a result of the determination, to generate a signal that causes a changed precoding codebook bitmap to be sent to the wireless terminal.

In an example embodiment the processor of the base station is configured to generate precoding codebook bitmap change information which is signaled to a radio network controller in a bitmap decision signal.

In an example embodiment of the base station the precoding codebook bitmap change information comprises an entire bitmap as changed as a result of the determination of the base station.

In an example embodiment of the base station the precoding codebook bitmap change information comprises a subset of a bitmap as changed as a result of the determination of the base station.

In an example embodiment of the base station the precoding codebook bitmap change information comprises an instruction for indicating which bits of a bitmap are to be changed as a result of the determination of the base station.

In an example embodiment of the base station the bitmap decision signal comprises NodeB Application Part (NBAP) signaling.

In an example embodiment of the base station the bitmap decision signal comprises an information element included in a message sent from the base station to the radio network controller.

In an example embodiment of the base station the processor is configured to include the information element in a PHYSICAL SHARED CHANNEL RECONFIGURATION RESPONSE message.

In an example embodiment of the base station the processor is configured to include the information element in at least one of the following messages: NBAP/RNSAP "RADIO LINK SETUP RESPONSE message; RADIO LINK ADDITION RESPONSE message; RADIO LINK RECONFIGURATION READY message; and RADIO LINK RECONFIGURATION RESPONSE message.

In an example embodiment of the base station the processor is configured to include the information element in at least one of the following messages: HS-DSCH Information Response message; and HS-DSCH FDD Secondary Serving Information Response message.

In an example embodiment of the base station the processor is configured to include the information element in a RADIO LINK PARAMETER UPDATE INDICATION message.

In an example embodiment of the base station the processor is configured to include the information element in a Iub/Iur data or control frame.

In an example embodiment of the base station the processor is configured to make the determination in conjunction with at least one of a cell setup procedure, a cell reconfiguration procedure, a physical shared channel setup procedure, and a physical shared channel reconfiguration procedure.

In an example embodiment of the base station the processor is configured to make the determination when at least one of the following occurs: a dedicated radio link is setup; a dedicated radio link is added; and dedicated radio link is reconfigured.

In an example embodiment of the base station the processor is configured to use feedback information from the wireless terminal to make the determination, and the processor is configured to send the changed precoding codebook bitmap during a connection with the wireless terminal.

In an example embodiment of the base station the processor is configured to make the determination when the feedback information indicates at least one of the following: a change in location of the wireless terminal; a change in speed of the wireless terminal; a specified rank indicator and a predetermined level of packet filling of packets in the connection.

In an example embodiment the processor generates the changed precoding codebook bitmap and sends the changed precoding codebook bitmap to the wireless terminal.

In another of its aspects the technology disclosed herein concerns a method in a base station of a radio access network which is in wireless communication with a wireless terminal served by the base station. The method in the base station comprises making a determination to change a precoding codebook bitmap used by the wireless terminal to report parameters to the base station; and, as a result of the determination, generating a signal that causes a changed precoding codebook bitmap to be sent to the wireless terminal.

In an example embodiment and mode, the method in the base station further comprises generating precoding codebook bitmap change information which is signaled to a radio network controller in a bitmap decision signal.

In an example embodiment and mode of the method in the base station the precoding codebook bitmap change information comprises an entire bitmap as changed as a result of the determination of the base station.

In an example embodiment and mode of the method in the base station, the precoding codebook bitmap change information comprises a subset of a bitmap as changed as a result of the determination of the base station.

In an example embodiment and mode of the method in the base station the precoding codebook bitmap change information comprises an instruction for indicating which bits of a bitmap are to be changed as a result of the determination of the base station.

In an example embodiment and mode of the method in the base station the bitmap decision signal comprises NodeB Application Part (NBAP) signaling.

In an example embodiment and mode of the method in the base station the bitmap decision signal comprises an information element included in a message sent from the base station to the radio network controller.

In an example embodiment and mode the method in the base station further comprises including the information element in a PHYSICAL SHARED CHANNEL RECONFIGURATION RESPONSE message.

In an example embodiment and mode the method in the base station further comprises including the information element in at least one of the following messages: NBAP/RNSAP "RADIO LINK SETUP RESPONSE message; RADIO LINK ADDITION RESPONSE message; RADIO LINK RECONFIGURATION READY message; and RADIO LINK RECONFIGURATION RESPONSE message.

In an example embodiment and mode the method in the base station further comprises including the information element in at least one of the following messages HS-DSCH Information Response message; and HS-DSCH FDD Secondary Serving Information Response message.

In an example embodiment and mode the method in the base station further comprises including the information element in a RADIO LINK PARAMETER UPDATE INDICATION message.

In an example embodiment and mode the method in the base station further comprises including the information element in a Iub/Iur data or control frame.

In an example embodiment and mode the method in the base station further comprises making the determination in conjunction with at least one of a cell setup procedure, a cell reconfiguration procedure, a physical shared channel setup procedure, and a physical shared channel reconfiguration procedure.

In an example embodiment and mode the method in the base station further comprises making the determination when at least one of the following occurs: a dedicated radio link is setup; a dedicated radio link is added; and dedicated radio link is reconfigured.

In an example embodiment and mode the method in the base station further comprises using feedback information from the wireless terminal to make the determination; and sending the changed precoding codebook bitmap during a connection with the wireless terminal.

In an example embodiment and mode the method in the base station further comprises making the determination when the feedback information indicates at least one of the following: a change in location of the wireless terminal; a change in speed of the wireless terminal; a specified rank indicator and a predetermined level of packet filling of packets in the connection.

In an example embodiment and mode the method in the base station further comprises generating the changed precoding codebook bitmap and sending the changed precoding codebook bitmap to the wireless terminal.

In another of its aspects the technology disclosed herein concerns a method in a radio network controller (RNC) node of a radio access network which serves a radio base station, the base station being in wireless communication with a wireless terminal served by the base station. The method in the radio network controller node comprises upon the base station making a determination to change a precoding codebook bitmap used by a wireless terminal to report parameters to the base station, receiving precoding codebook bitmap change information in a bitmap decision signal; and, the radio network controller sending a changed precoding codebook bitmap to the wireless terminal.

In an example embodiment and mode of the method in the radio network controller the precoding codebook bitmap change information comprises an entire bitmap as changed as a result of the determination of the base station.

In an example embodiment and mode of the method in the radio network controller the precoding codebook bitmap change information comprises a subset of a bitmap as changed as a result of the determination of the base station.

In an example embodiment and mode of the method in the radio network controller the precoding codebook bitmap change information comprises an instruction for indicating which bits of a bitmap are to be changed as a result of the determination of the base station.

In an example embodiment and mode of the method in the radio network controller the bitmap decision signal comprises NodeB Application Part (NBAP) signaling.

In an example embodiment and mode of the method in the radio network controller the bitmap decision signal comprises an information element included in a message sent from the base station to the radio network controller.

In an example embodiment and mode the method in the radio network controller node further comprises including the information element in a PHYSICAL SHARED CHANNEL RECONFIGURATION RESPONSE message.

In an example embodiment and mode the method in the radio network controller node further comprises including the information element in at least one of the following messages: NBAP/RNSAP "RADIO LINK SETUP RESPONSE message; RADIO LINK ADDITION RESPONSE message; RADIO LINK RECONFIGURATION READY message; and RADIO LINK RECONFIGURATION RESPONSE message.

In an example embodiment and mode the method in the radio network controller node further comprises including the information element in at least one of the following messages HS-DSCH Information Response message; and HS-DSCH FDD Secondary Serving Information Response message.

In an example embodiment and mode the method in the radio network controller node further comprises including the information element in a RADIO LINK PARAMETER UPDATE INDICATION message.

In an example embodiment and mode the method in the radio network controller node further comprises including the information element in a Iub/Iur data or control frame.

In an example embodiment and mode the method in the radio network controller node further comprises receiving the precoding codebook bitmap change information upon the base station making the determination in conjunction with at least one of a cell setup procedure, a cell reconfiguration procedure, a physical shared channel setup procedure, and a physical shared channel reconfiguration procedure.

In an example embodiment and mode the method in the radio network controller node further comprises receiving the precoding codebook bitmap change information when at least one of the following occurs: a dedicated radio link is setup; a dedicated radio link is added; and dedicated radio link is reconfigured.

In an example embodiment and mode the method in the radio network controller node further comprises receiving the precoding codebook bitmap change information when feedback from the wireless terminal to the base station indicates at least one of the following: a change in location of the wireless terminal; a change in speed of the wireless terminal; a specified rank indicator and a predetermined level of packet filling of packets in the connection.

In an example embodiment and mode the method in the radio network controller node further comprises sending the changed precoding codebook bitmap in at least one of the following messages: an ACTIVE SET UPDATE message (in case the UTRAN needs to add, replace or delete radio links in the active set of the UE); a CELL UPDATE CONFIRM message; a PHYSICAL CHANNEL RECONFIGURATION message; a RADIO BEARER RECONFIGURATION message; a RADIO BEARER RELEASE message; a RADIO BEARER SETUP message; and a TRANSPORT CHANNEL RECONFIGURATION message.

In another of its aspects the technology disclosed herein concerns a radio network controller (RNC) node of a radio access network which serves a radio base station, the base station being in wireless communication with a wireless terminal served by the base station. The radio network controller (RNC) node comprises an interface and a processor. The interface is configured to receive precoding codebook bitmap change information in a bitmap decision signal upon the base station making a determination to change a precoding codebook bitmap used by a wireless terminal toreport parameters to the base station. The processor is configured to send a changed precoding codebook bitmap to the wireless terminal.

In an example embodiment of the radio network controller node the precoding codebook bitmap change information comprises an entire bitmap as changed as a result of the determination of the base station.

In an example embodiment of the radio network controller node the precoding codebook bitmap change information comprises a subset of a bitmap as changed as a result of the determination of the base station.

In an example embodiment of the radio network controller node the precoding codebook bitmap change information comprises an instruction for indicating which bits of a bitmap are to be changed as a result of the determination of the base station.

In an example embodiment of the radio network controller node the bitmap decision signal comprises NodeB Application Part (NBAP) signaling.

In an example embodiment of the radio network controller node the bitmap decision signal comprises an information element included in a message sent from the base station to the radio network controller.

In an example embodiment of the radio network controller node the processor is configured to include the information element in a PHYSICAL SHARED CHANNEL RECONFIGURATION RESPONSE message.

In an example embodiment of the radio network controller node the processor is configured to include the information element in at least one of the following messages: NBAP/RNSAP "RADIO LINK SETUP RESPONSE message; RADIO LINK ADDITION RESPONSE message; RADIO LINK RECONFIGURATION READY message; and RADIO LINK RECONFIGURATION RESPONSE message.

In an example embodiment of the radio network controller node the processor is configured to include the information element in at least one of the following messages HS-DSCH Information Response message; and HS-DSCH FDD Secondary Serving Information Response message.

In an example embodiment of the radio network controller node the processor is configured to include the information element in a RADIO LINK PARAMETER UPDATE INDICATION message.

In an example embodiment of the radio network controller node the processor is configured to include the information element in a Iub/Iur data or control frame.

In an example embodiment of the radio network controller node the processor is configured to receive the precoding codebook bitmap change information upon the base station making the determination in conjunction with at least one of a cell setup procedure, a cell reconfiguration procedure, a physical shared channel setup procedure, and a physical shared channel reconfiguration procedure.

In an example embodiment of the radio network controller node the processor is configured to send the changed precoding codebook bitmap in at least one of the following messages: an ACTIVE SET UPDATE message (in case the UTRAN needs to add, replace or delete radio links in the active set of the UE); a CELL UPDATE CONFIRM message; a PHYSICAL CHANNEL RECONFIGURATION message; a RADIO BEARER RECONFIGURATION message; a RADIO BEARER RELEASE message; a RADIO BEARER SETUP message; and a TRANSPORT CHANNEL RECONFIGURATION message.

In another of its aspects the technology disclosed herein concerns a method in a wireless terminal. The method in the wireless terminal comprises, after having received or used an initial precoding codebook bitmap and upon a base station making a determination to change a precoding codebook bitmap used by a wireless terminal to report parameters to the base station, receiving a changed precoding codebook bitmap from a node of the radio access network; using the changed precoding codebook bitmap to report the parameters to the base station.

In an example embodiment and mode the method in the wireless terminal further comprises receiving the changed precoding codebook bitmap from a radio network controller (RNC) node of the radio access network.

In an example embodiment and mode the method in the wireless terminal further comprises receiving the changed precoding codebook bitmap from the node of the radio access network upon the base station making the determination in conjunction with at least one of a cell setup procedure, a cell reconfiguration procedure, a physical shared channel setup procedure, and a physical shared channel reconfiguration procedure.

In an example embodiment and mode the method in the wireless terminal further comprises receiving the changed precoding codebook bitmap from the node of the radio access network when at least one of the following occurs: a dedicated radio link is setup; a dedicated radio link is added; and dedicated radio link is reconfigured.

In an example embodiment and mode the method in the wireless terminal further comprises receiving the changed precoding codebook bitmap from the node of the radio access network during a connection involving the wireless terminal.

In an example embodiment and mode the method in the wireless terminal further comprises receiving the changed precoding codebook bitmap from the node of the radio access network when feedback information from the wireless terminal indicates at least one of the following: a change in location of the wireless terminal; a change in speed of the wireless terminal; a specified rank indicator and a predetermined level of packet filling of packets in the connection.

In an example embodiment and mode of the method in the wireless terminal, the node of the radio access network is a radio network controller, and wherein the wireless terminal receives the changed precoding codebook bitmap from the radio network controller in at least one of the following messages: an ACTIVE SET UPDATE message (in case the UTRAN needs to add, replace or delete radio links in the active set of the UE); a CELL UPDATE CONFIRM message; a PHYSICAL CHANNEL RECONFIGURATION message; a RADIO BEARER RECONFIGURATION message; a RADIO BEARER RELEASE message; a RADIO BEARER SETUP message; and a TRANSPORT CHANNEL RECONFIGURATION message.

In an example embodiment and mode the method in the wireless terminal further comprises receiving the changed precoding codebook bitmap from the base station.

In another of its aspects the technology disclosed herein concerns a wireless terminal. The wireless terminal comprises an interface and a processor. The interface of the wireless terminal is configured for wireless communications with a base station of a radio access network, the base station being served by a radio network controller (RNC). The processor is configured to receive a changed precoding codebook bitmap from a node of the radio access network after having already received or used an initial precoding codebook bitmap and upon a base station making a determination to change a precoding codebook bitmap used by a wireless terminal to report parameters to the base station; and, to use the changed precoding codebook bitmap to report the parameters to the base station.

In an example embodiment of the wireless terminal the processor is configured to receive the changed precoding codebook bitmap from the radio network controller node of the radio access network.

In an example embodiment of the wireless terminal the processor is configured to receive the changed precoding codebook bitmap from the node of the radio access network upon the base station making the determination in conjunction with at least one of a cell setup procedure, a cell reconfiguration procedure, a physical shared channel setup procedure, and a physical shared channel reconfiguration procedure.

In an example embodiment of the wireless terminal the processor is configured to receive the changed precoding codebook bitmap from the node of the radio access network when at least one of the following occurs: a dedicated radio link is setup; a dedicated radio link is added; and dedicated radio link is reconfigured.

In an example embodiment of the wireless terminal the processor is configured to receive the changed precoding codebook bitmap from the node of the radio access network during a connection involving the wireless terminal.

In an example embodiment of the wireless terminal the processor is configured to receive the changed precoding codebook bitmap from the node of the radio access network when feedback information from the wireless terminal indicates at least one of the following: a change in location of the wireless terminal; a change in speed of the wireless terminal; a specified rank indicator and a predetermined level of packet filling of packets in the connection.

In an example embodiment of the wireless terminal, the node of the radio access network is a radio network controller, and processor is configured to receive the changed precoding codebook bitmap in at least one of the following messages: an ACTIVE SET UPDATE message (in case the UTRAN needs to add, replace or delete radio links in the active set of the UE); a CELL UPDATE CONFIRM message; a PHYSICAL CHANNEL RECONFIGURATION message; a RADIO BEARER RECONFIGURATION message; a RADIO BEARER RELEASE message; a RADIO BEARER SETUP message; and a TRANSPORT CHANNEL RECONFIGURATION message.

In an example embodiment of the wireless terminal the processor is configured to receive the changed precoding codebook bitmap from the base station.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
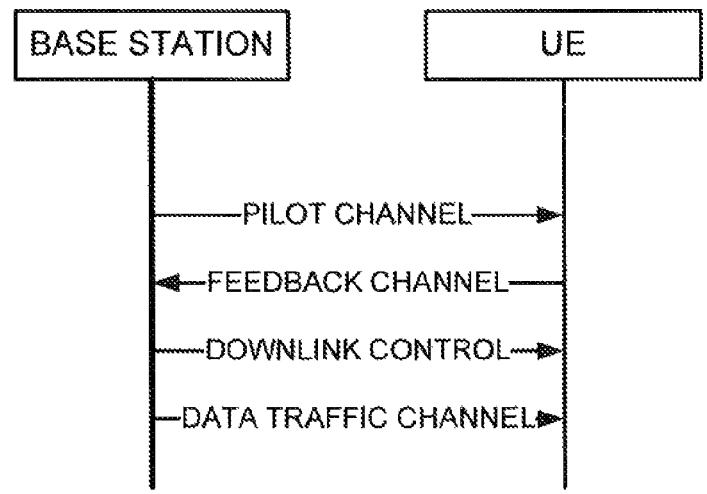
FIG. 1 is a diagrammatic view of an example message sequence between a base station and a UE.
Figure 2:
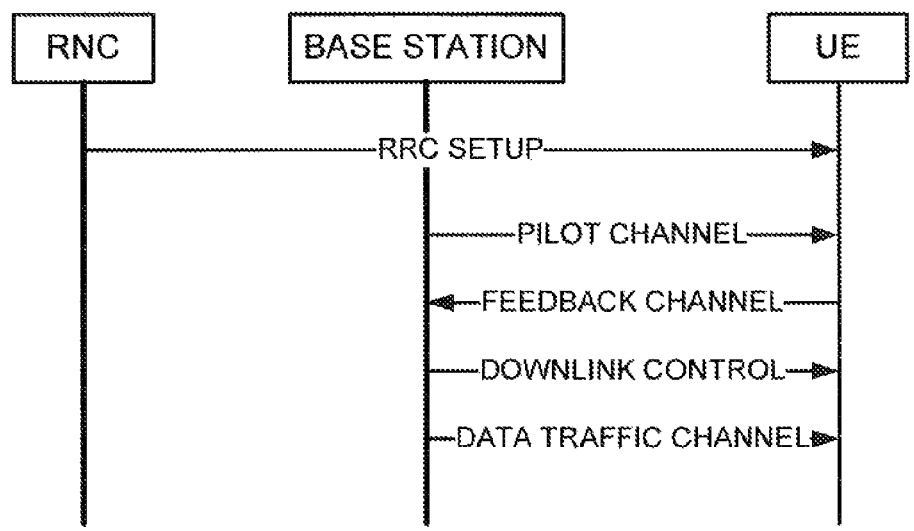
FIG. 2 is a diagrammatic view of an example message sequence which sets up this implementation of codebook subset restriction operation.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

From the foregoing it can be understood that in conventional practice, once the RNC sends the bitmap to the wireless terminal, there is no other way to change the bitmap. This static configuration of codebook may not be beneficial for all channel conditions. For example the rank of the UE may change and the UE may keep on sending the rank, which is not useful at the NodeB.

The technology disclosed herein provides apparatus and methods for facilitating change of a bitmap in a codebook subset restriction operation. In other words, the NodeB can dynamically change the configuration of the bitmap. To do so, in at least some example embodiments the technology disclosed herein introduces new signaling between a NodeB and a RNC. Providing change in codebook subset restriction improves system performance by good link adaptation while at the same time reduce the complexity at the wireless terminal.

For a 4Tx antenna system, the precoding codebook (or simply "codebook") may contain a total of 64 elements (16 elements per rank). In this instance, the bitmap may include a bit sequence $a_{63}, \ldots, a_3, a_2, a_1, a_0$ in which $a_{63}$ and $a_0$ are respectively assumed to represent the most and least significant bits (MSB, LSB). A bit value of zero (or one) can be used to indicate that the feedback reporting (e.g., RI/PCI reporting) is prohibited for precoder(s) associated with the bit.

First Example Embodiment

Figure 3A:
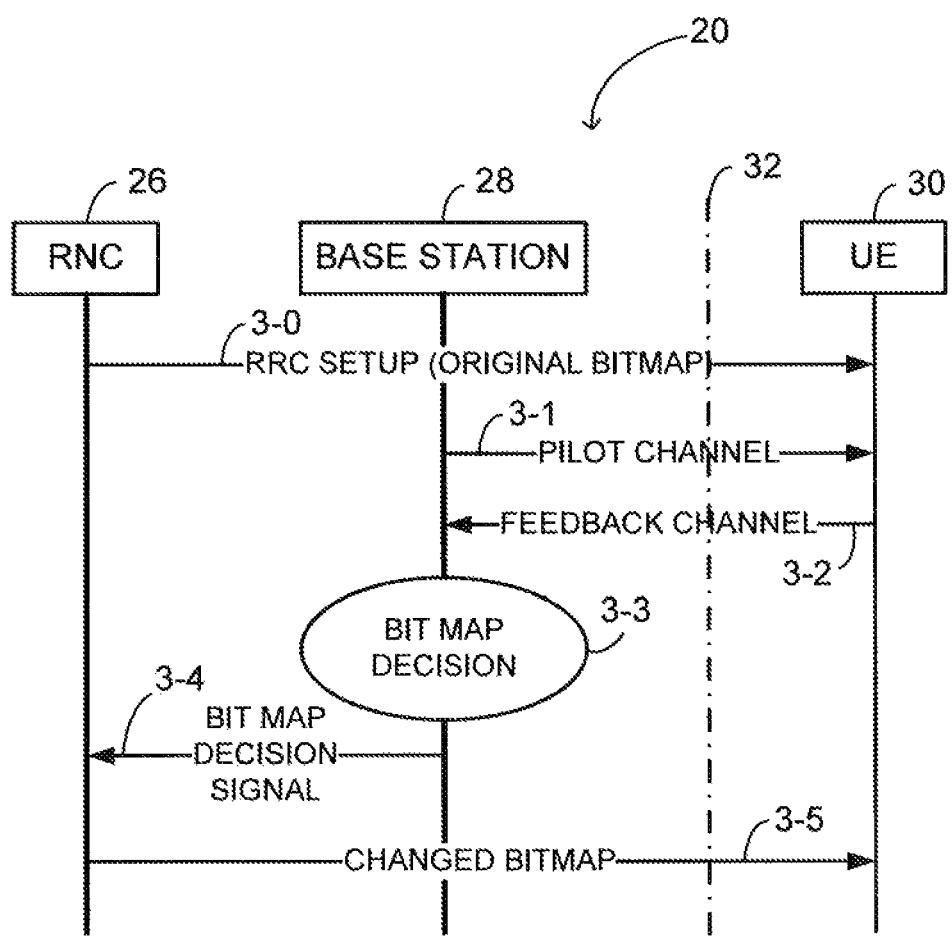
FIG. 3A is a diagrammatic view of an example message sequence which implements flexible codebook utilization according to a generic first example embodiment and mode of the technology disclosed herein.

A first general example embodiment and mode of operation which facilitates dynamic change of configuration of the precoding codebook bitmap is illustrated in FIG. 3A. FIG.

3A illustrates a first example embodiment of a telecommunications network 20 in which flexible codebook utilization modes of the technology disclosed herein may be implemented. The telecommunications network 20 of FIG. 3 includes a radio network controller (RNC) 26; one example base station node (NodeB) 28 served by the RNC; and one example wireless terminal (UE) 30 served by the base station. The wireless terminal 30 communicates over radio or air interface 32 with the base station 28.

Act 3-0 of FIG. 3A illustrates the radio network controller (RNC) 26 sending an original or initial precoding codebook bitmap to wireless terminal 30 for use in a connection involving wireless terminal 30. The original precoding codebook bitmap may be sent using radio resource control (RRC) setup signaling. The original precoding codebook bitmap is sent from the radio network controller (RNC) 26 to the base station 28, and then from the base station 28 over the air interface 32 to wireless terminal 30.

Act 3-1 of FIG. 3A illustrates the base station 28, in conjunction with the connection established between base station 28 and wireless terminal 30, sending a pilot channel Act 3-2 of FIG. 3A illustrates the wireless terminal 30 sending feedback information on a feedback channel to base station 28. In some instances the feedback information may be based on measurements taken with respect to the pilot channel of act 3-1.

Act 3-3 of FIG. 3A illustrates the NodeB making a bitmap decision. In making the bitmap decision the NodeB decodes the bitmap (based on UE measurements or UE reports or any other method) and makes a determination whether there should be any changes in the precoding codebook bitmap.

When changes to the precoding codebook bitmap need to be made, as act 3-4 the NodeB conveys such bitmap change information the information to the RNC via signaling, shown as a bitmap decision signal of act 3-4 in FIG. 3A. The bitmap decision signal may be, for example NodeB Application Part (NBAp) signaling. Upon receipt of the bitmap decision signal, as act 3-5 the RNC then sets the bitmap and conveys the changed bitmap to the UE, e.g., to wireless terminal 30. Sending of the changed bitmap to the wireless terminal 30 may occur, for example, through RRC signaling.

Figure 3B:
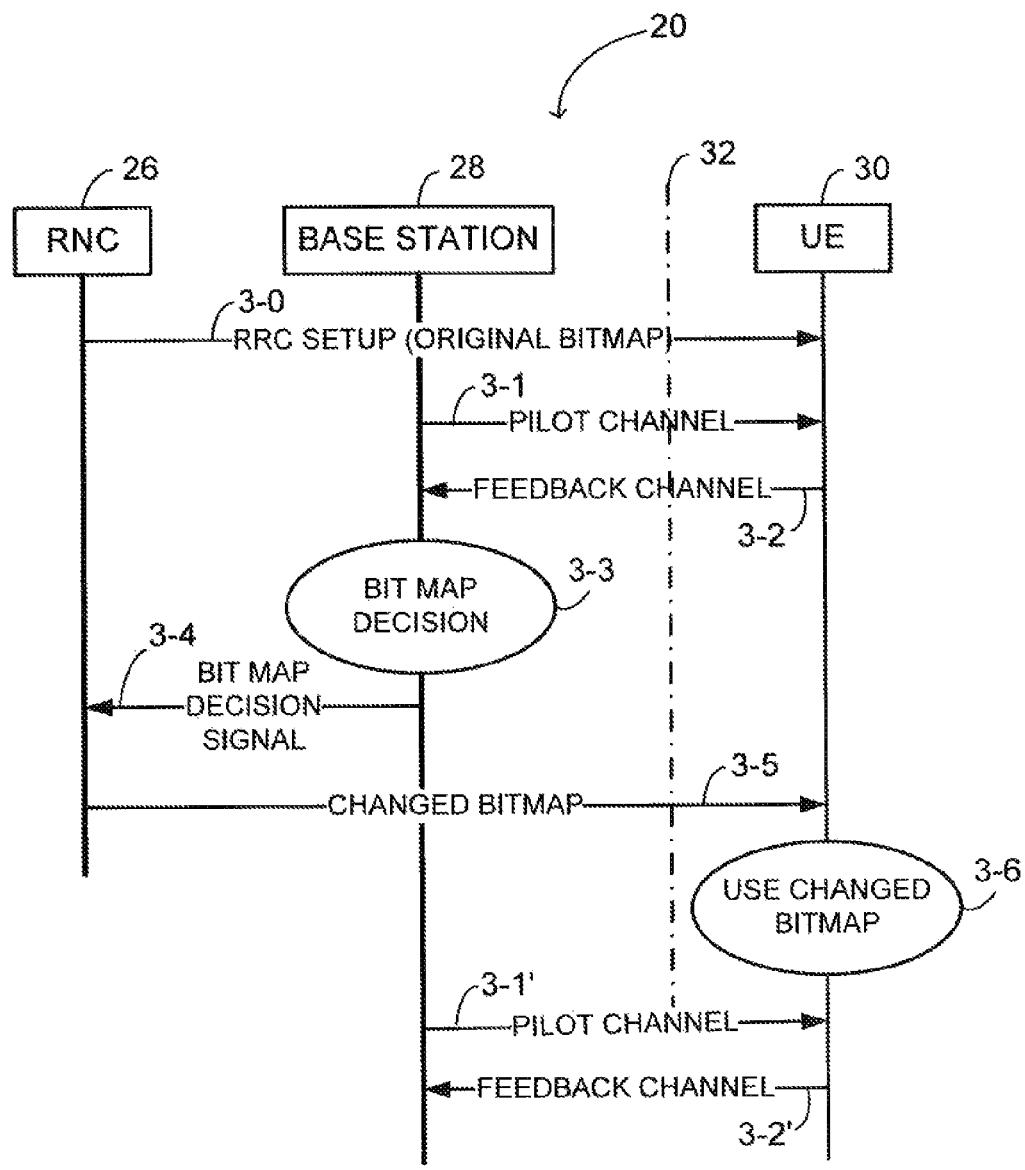
FIG. 3B is a diagrammatic view of an example message sequence similar to that of FIG. 3A, but further showing actions occurring after a changed bitmap is sent to a wireless terminal.

FIG. 3B shows an example message sequence similar to that of FIG. 3B, but further shows actions which may occur in an example embodiment and mode after a changed bitmap is sent to a wireless terminal, e.g. after act 3-5. In particular, FIG. 3B shows the wireless terminal as implementing (e.g., "using") the changed bitmap which was received from the base station 28 in act 3-5. Upon implementation of the changed bitmap, the wireless terminal 30 uses the changed precoding codebook bitmap in providing the feedback shown as act 3-2'. As understood from the foregoing, the feedback of act 3-2' may be based on signals for information received/measured with respect to the pilot channel (transmission of the pilot channel being depicted as act 3-1' in FIG. 3B).

Figure 4:
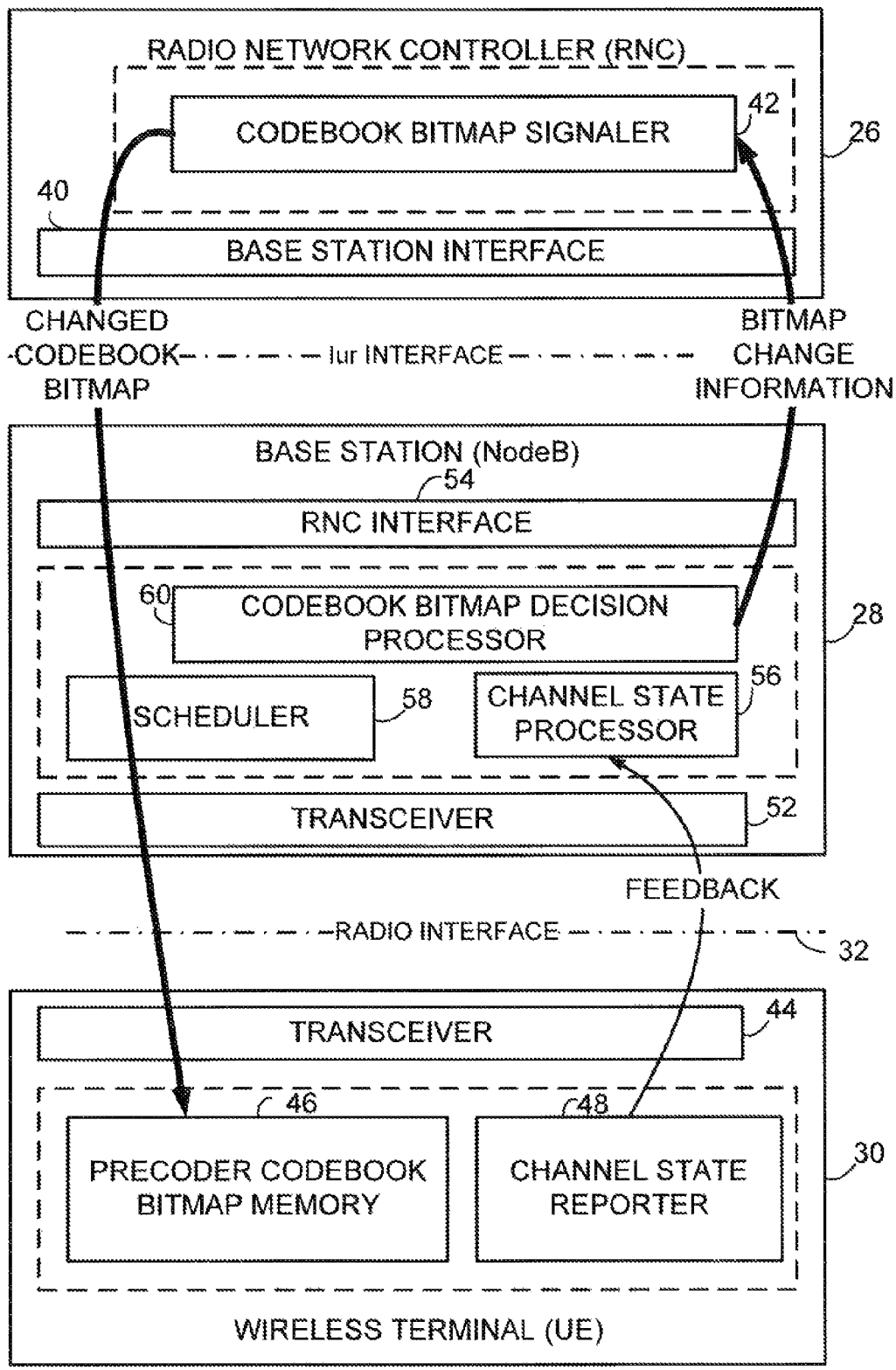
FIG. 4 is a schematic view of a telecommunications network suitable in which flexible codebook utilization may be implemented in a first example embodiment and mode of the technology disclosed herein.

FIG. 4 illustrates an example embodiment of the telecommunications 20 network suitable in which flexible codebook utilization embodiments and modes of the technology disclosed herein may be implemented. The telecommunications network of FIG. 4 includes radio network controller (RNC) 26; one example base station node (NodeB) 28 served by the RNC 26; and one example wireless terminal (UE) 30 served by the base station 28. The RNC 26 communicates through its base station interface 40 to the base station node 28. Some communications are destined to the base station 28 itself, other communications (such as RRC signaling) are ultimately destined to the wireless terminal 30. FIG. 4 shows the RNC 26 as also comprising codebook bitmap signaler 42 which sends to the wireless terminal 30 (through the base station 28) a signal indicative of the codebook bitmap to be used by the wireless terminal, e.g., a changed precoding codebook bitmap. The codebook bitmap signaler 42 may be implemented by a processor.

The wireless terminal 30 includes transceiver or interface 44 through which the wireless terminal 30 communicates over radio interface 32 with the base station 28. The wireless terminal also comprises precoding codebook bitmap memory 46 for storing the precoder codebook bitmap which the wireless terminal 30 receives from the radio network controller (RNC) 26. In addition, the wireless terminal 30 comprises feedback or channel state reporter 48 through which the wireless terminal 30 reports information (e.g., the aforementioned parameters such as RI, PCI, and CQI) to the base station 28. The feedback or channel state reporter 48 may be implemented by a processor. The processor may also implement the precoder codebook bitmap as specified by the radio access network node.

The base station 28 includes transceiver or interface 52 through which the base station 28 communicates with one or more wireless terminals 30 served by the base station 28. The base station 28 also comprises an interface 54 through which the base station 28 communicates to its supervisory RNC 26. For purposes pertinent to the technology disclosed herein, the base station 28 also comprises channel state processor 56 which receives and processes the channel state information reported by the wireless terminal 30. Using, e.g., this channels state information, a scheduler 58 of the base station 28 decides the modulation, coding scheme, PCI, and RI to be used for the data traffic channel, which is sent to the wireless terminal 30 via a downlink (DL) control channel. The base station 30 also includes codebook bitmap decision processor 60 which makes the decision depicted act 3-3 of FIG. 3A: a decision of precoder selection, e.g., of how the precoder bitmap is to be configured for transmission to the RNC 26. The decision of the base station 28 as to how to configure the precoder bitmap may be transmitted to the RNC in various different ways, at least four example embodiments and modes being described herein.

Figure 5:
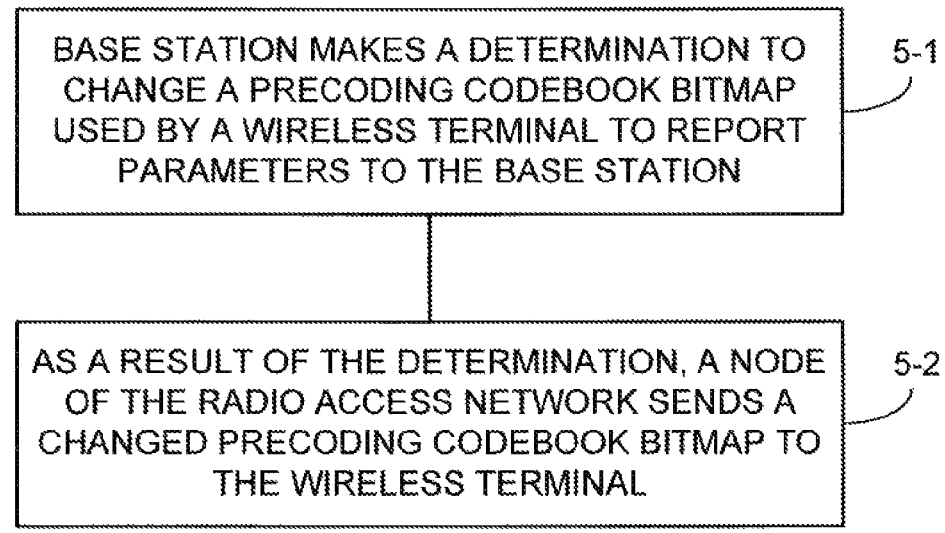
FIG. 5 is a flowchart illustrating example acts or steps involved in operating a radio access network according to an example embodiment and mode.
Figure 6:
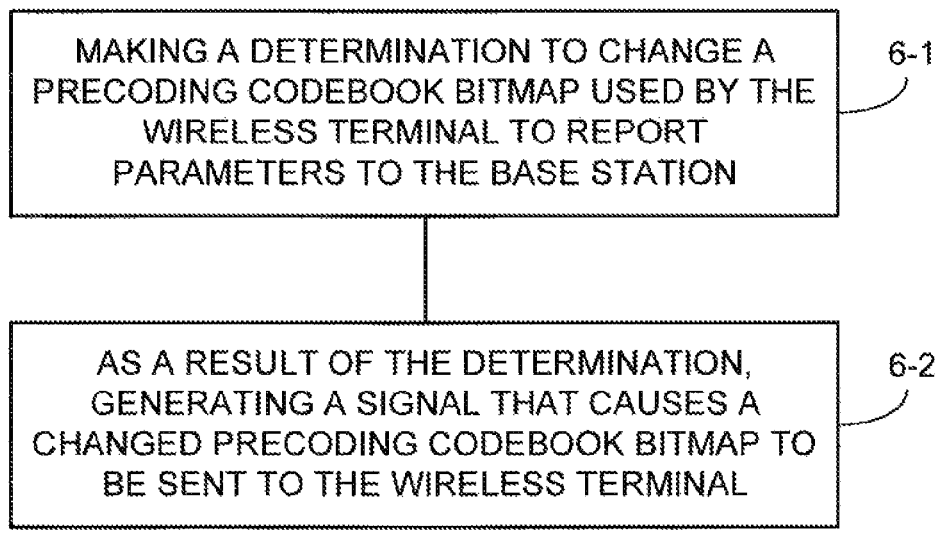
FIG. 6 is a flowchart illustrating example acts or steps involved in operating a base station according to an example embodiment and mode.
Figure 7:
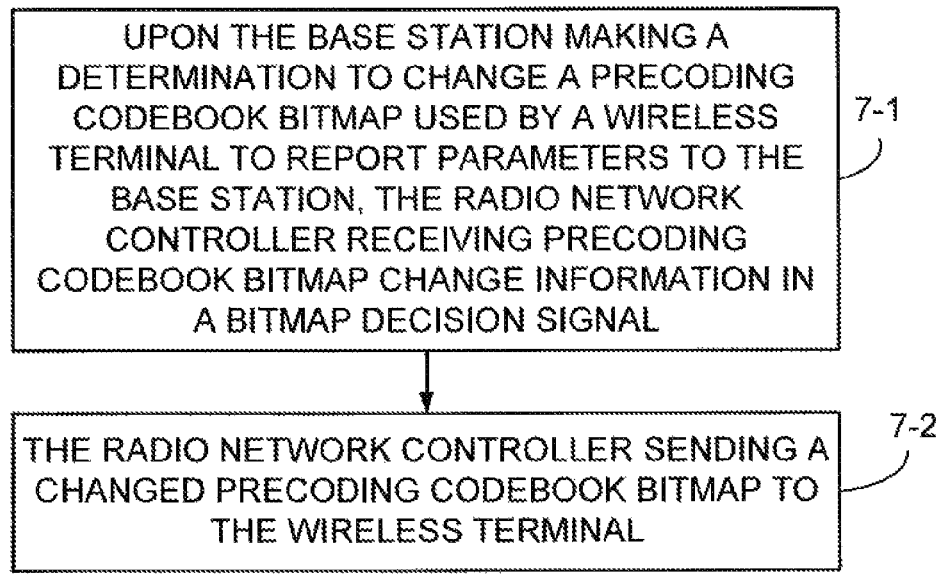
FIG. 7 is a flowchart illustrating example acts or steps involved in operating a radio network controller according to an example embodiment and mode.
Figure 8:
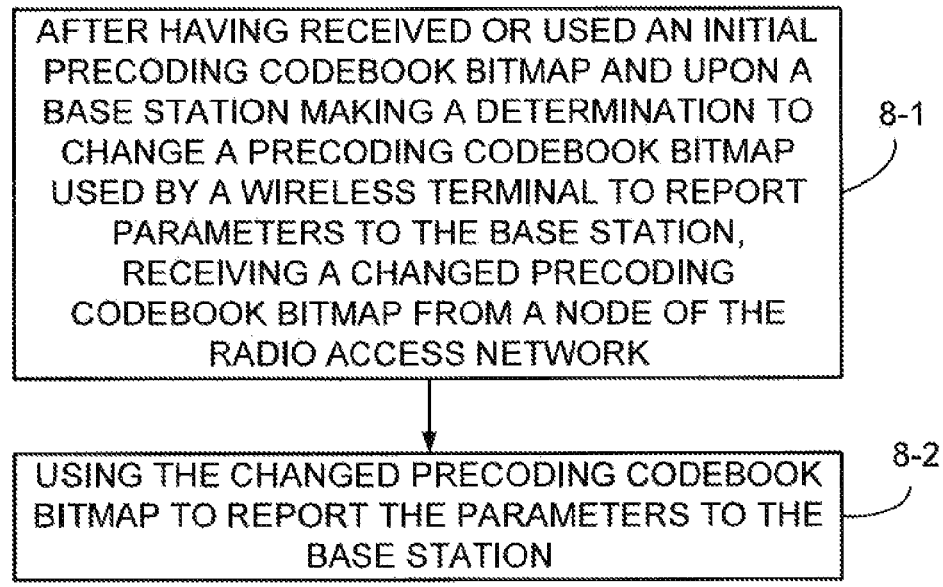
FIG. 8 is a flowchart illustrating example acts or steps involved in operating a wireless terminal according to an example embodiment and mode.

The technology disclosed herein encompasses methods of operating, e.g., methods in, each of a radio access network; a base station 28, radio network controller (RNC) 26, and wireless terminal 30. FIG. 5 illustrates example basic, generic acts involved in operating a radio access network; FIG. 6 illustrates example basic, generic acts involved in operating base station 28; FIG. 7 illustrates example basic, generic acts involved in radio network controller (RNC) 26; and FIG. 8 illustrates example basic, generic acts involved in wireless terminal 30.

FIG. 5 shows basic, generic acts involved in operating a radio access network. Act 5-1 comprises base station 28 making a determination to change a precoding codebook bitmap used by a wireless terminal 30 (the precoding codebook bitmap being used by the wireless terminal 30 to report parameters to the base station). As a result of the determination, as act 5-2 a node of the radio access network sends a changed precoding codebook bitmap to the wireless terminal. In the example of FIG. 3A and FIG. 4, the node of the radio access network sends a changed precoding codebook bitmap to the wireless terminal is the radio network controller (RNC) 26. The radio network controller (RNC) 26 sends the changed precoding codebook bitmap to the wireless terminal through the base station 28 which serves the wireless terminal 30.

FIG. 6 illustrates example basic, generic acts involved in operating base station 28; Act 6-1 comprises the base station 28 making a determination to change a precoding codebook bitmap used by the wireless terminal 30 to report parameters to the base station. Act 6-2 comprises, as a result of the determination, the base station 28 generating a signal that causes a changed precoding codebook bitmap to be sent to the wireless terminal.

FIG. 7 illustrates example basic, generic acts involved in radio network controller 26. Act 7-1 comprises, upon the base station 28 making a determination to change a precoding codebook bitmap used by a wireless terminal 30 to report parameters to the base station, the radio network controller 26 receiving precoding codebook bitmap change information in a bitmap decision signal. Act 7-2 comprises the radio network controller 26 sending a changed precoding codebook bitmap to the wireless terminal 30 (e.g., sending the changed precoding codebook bitmap through the base station 28).

FIG. 8 illustrates example basic, generic acts involved in wireless terminal 30. Act 8-1 comprises the wireless terminal 30, after having received or used an initial precoding codebook bitmap and upon a base station 28 making a determination to change a precoding codebook bitmap used by the wireless terminal to report parameters to the base station, the wireless terminal 30 receiving a changed precoding codebook bitmap from a node of the radio access network. In the example embodiment and mode of FIG. 3A and FIG. 4, the wireless terminal 30 receives the changed precoding codebook bitmap from the radio network controller (RNC) 26. Act 8-2 comprises the wireless terminal 30 using the changed precoding codebook bitmap to report the parameters to the base station 28.

Conveyance of the information from the NodeB to the RNC may be accomplished in different ways in different example modes and embodiments, some of which are described below.

Figures 9A, 9B, 9C:
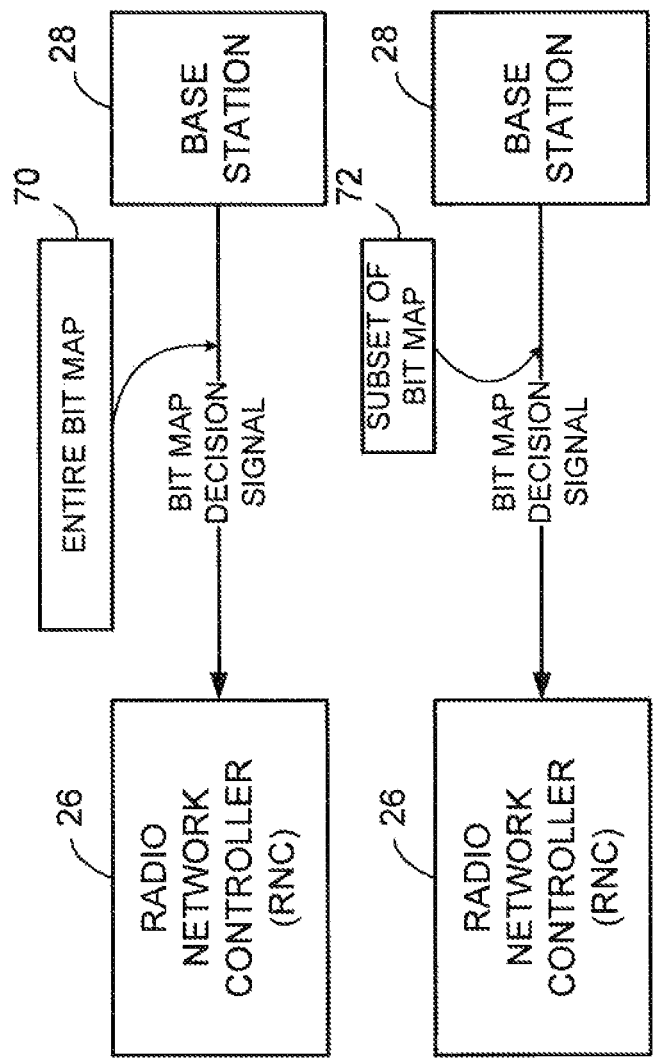
FIG. 9A, FIG. 9B, and FIG. 9C are diagrammatic views illustrating embodiments of different ways for expressing content of a bitmap decision signal.

In conveying changes to the precoding codebook bitmap as a result of its bitmap decision, in an example embodiment and mode shown in FIG. 9A the NodeB may convey the entire bitmap 70, e.g., a sixty-four bit string which contains the whole (changed) precoding codebook bitmap. Each bit of the bitmap corresponds to a particular code, and setting (or unsetting) of the corresponding bit indicates whether the codebook corresponding to that particular code is to be utilized.

In another example embodiment shown in FIG. 9B only certain subset(s) 72 of the precoding codebook bitmap may need to be conveyed from the NodeB to the RNC in order to reflect the change in the precoding codebook bitmap, e.g., the changed precoding codebook bitmap, so long as both the NodeB and RNC have advance knowledge or some way of mapping or aligning the content of the bitmap decision signal (which reflects the changed bits of the bitmap) to the entire precoding codebook bitmap.

In yet other embodiments shown in FIG. 9C, the bitmap decision signal may include instructions 74 as to how to change the precoding codebook bitmap in accordance with the bitmap decision of the NodeB, e.g., an indication of which bit(s) of the precoding codebook bitmap are affected by the bitmap decision. For example, the bitmap decision signal may include an instruction 74 in the form a value corresponding to a bit position of the bitmap whose contents is to be flipped (e.g., changed from 0 to 1 or from 1 to 0).

The bitmap decision signal may be a new and/or dedicated signal, or the bitmap decision signal may be included (e.g., as an information element) in an existing or standardized signal. In some example embodiments hereof, a new information element corresponding to the bitmap decision signal is referred to as "precoding weight set restriction". An example of the "precoding weight set restriction" is shown in Table 0 below. Examples of existing messages to which the new information element may be added are shown further below in the Tables with respect to corresponding example embodiments and modes. The new IE may be added under the existing IE group in the respective messages, for example, to be added under RL Information Response IE or to be added in the HS-DSCH Information Response IE/HS-DSCH FDD Secondary Serving Information Response IE. The later is especially good if different carriers shall have a different precoder. It should be understood, however, that the new IE may be introduced in other forms, or added in different places, and that the examples of the tables provided herein are merely non-limiting illustrations.

TABLE 0

"Precoding Weight Set Restriction" information element

| IE/GroupName | Presence | Range | IE Type and Reference | Semantics Description |
|---|---|---|---|---|
| Precoding weight set restriction | | | BIT STRING (64) | Each bit indicates whether a code in the Codebook is supported or not. The value 1 of a bit indicates that the corresponding code in the codebook is supported and value 0 indicates that the corresponding code in the Codebook is not supported. Note: The Bit mapping is as defned in TS 25.331 [18]. If the bit has no corresponding code in the Codebook, it is set to 0. |

It was mentioned above that the bitmap decision signal may be NodeB Application Part (NBAp) signaling. NBAp signaling may particularly be the case when on cell level. When involving a dedicated wireless terminal the signaling may be NBAP/RNSAP. There are also other alternatives, either via NBAP/RNSAP control plane signaling, or via Iur/Iub user plane frames, for example data frame or control frame.

The first example embodiment and mode, in which the changed precoding codebook bitmap is sent from the radio network controller (RNC) 26 to the wireless terminal 30, may have numerous implementations, several of which are described below. It should be appreciated that the example implementations may be introduced at the same time. For example the first embodiment configures the whole cell; the second embodiment is used when the Radio Link is setup/add/reconfiguration; and the third example embodiment there is no request from RNC, but NodeB wants to initiate change.

First Example Implementation

In a first example implementation, the NodeB sends bitmap decision signal, e.g., the Precoding Weight Set Restriction, to the RNC (which may be a CRNC) and makes such transmission during the cell setup/reconfiguration procedure, or physical shared channel setup/reconfiguration procedure. In this way, the precoder selection may be common for the whole cell.

To implementation this first example implementation an additional information element (IE) may be added to a message such as a "PHYSICAL SHARED CHANNEL RECONFIGURATION RESPONSE" which is described in 3GPP TS 25.433 UTRAN Tub interface NodeB Application Part (NBAP) Signalling, V11.2.0 (2012-09), which is incorporated herein by reference, and in particular described in chapter 9.1.63 thereof. An example of addition of such a new information element is shown by the last information element "Precoding Weight Set Restriction" as shown in Table 1. The new IE "Precoding Weight Set Restriction" is thus defined to represent the selection of the Codebook. One example is to define "Precoding Weight Set Restriction" as a vector/bit string, where each bit represents one code. The string may be, for example, sixty four bits long. Each bit indicates whether a code in the codebook is supported or not. The value 1 of a bit indicates that the corresponding code in the codebook is supported and value 0 indicates that the corresponding code in the Codebook is not supported. In other words, when the bit is set to 1, it indicates the code in the codebook is used, when it is set to 0, it indicates the code is not used.

Second Example Implementation

In a second example implementation and mode the NodeB sends the bitmap decision signal, e.g., precoder selection to the RNC (e.g., SRNC), when the dedicated Radio Link is setup/add/reconfigured. For example, the NodeB may send the Precoding Weight Set Restriction in any one of the following messages: NBAP/RNSAP "RADIO LINK SETUP RESPONSE/RADIO LINK ADDITION RESPONSE/RADIO LINK RECONFIGURATION READY/RADIO LINK RECONFIGURATION RESPONSE". The second example implementation is illustrated by the message of Table 2 in which a new information element (IE) entitled "Precoding Weight Set Restriction" is added to the existing message "RADIO LINK SETUP RESPONSE". This existing message is understood by reference to 3GPP TS 25.433 UTRAN Iub interface NodeB Application Part (NBAP) Signalling, V11.2.0 (2012-09), which is incorporated herein by reference, and particularly described in chapter 9.1.37.1 thereof. Alternatively, the new IE may be added in the other positions in the existing message. Alternatively, the new IE may be added in the HS-DSCH Information Response/HS-DSCH FDD Secondary Serving Information Response. This approach may be particularly beneficial if different carriers shall have different precoder. In this regard, see, e.g., Table 5. When the NodeB is connected to SRNC via DRNC, then RNSAP messages are used in the control plane. Between the serving RNC (SRNC) and drift SRNC (DRNC) in the control plane RNSAP may be used; between DRNC and NodeB NBAP may be used.

Third Example Implementation

In a third example implementation and mode the NodeB uses the uplink (UL) feedback information from the UE (CQI, Pathloss, etc.) and selects the precoder during the connection. The NodeB sends to the RNC (e.g., SRNC) the bitmap decision signal, e.g., the Precoding Weight Set Restriction, when there is a change to the precoder selection. This method is particularly useful when NodeB wishes to dynamically choose the precoder for a given UE when certain condition/criteria is/are met. For example, NodeB will send the Precoding Weight Set Restriction in "RADIO LINK PARAMETER UPDATE INDICATION" when NodeB has a need to update the precoder selection or wish to send a new precoder selection. The third example implementation is illustrated by the message of Table 3 in which a new information element (IE) entitled "Precoding Weight Set Restriction" is added to an existing message such as a "RADIO LINK PARAMETER UPDATE INDICATION". This existing message is understood by reference to 3GPP TS 25.433 UTRAN Iub interface NodeB Application Part (NBAP) Signalling, V11.2.0 (2012-09), which is incorporated herein by reference, and particularly described in chapter 8.1.89.1 thereof. Alternatively, the new IE may be added under the existing IE group in this message, for example, to be added under HS-DSCH FDD Update Information/HS-DSCH FDD Secondary Serving Update Information. This later may be particularly beneficial if different carriers shall have different precoder selections. In this regard, see Table 6).

There are numerous situations in which the base station 28 may make a decision to change the precoding codebook bitmap during a connection in view of certain condition/criteria occurrences or changes. As one such example the base station 28 may make the determination when the feedback information indicates a change in location of the wireless terminal (e.g., a change from the wireless terminal 30 being in a center of a cell to an edge of a cell). As another such example the base station 28 may make the determination when the feedback information indicates a change in speed of the wireless terminal (e.g., a faster traveling wireless terminal may benefit from a different precoding codebook bitmap than a stationary or slower traveling wireless terminal). As yet another such example the base station 28 may make the determination when the feedback information indicates a specified rank indicator and a predetermined level of packet filling of packets in the connection (e.g., if there is one rank and all or most packets are filling a different precoding codebook bitmap may be preferable).

Fourth Example Implementation

In a fourth example implementation and mode the NodeB uses the Iub/Iur data or control frame to send the new IE "Precoding Weight Set Restriction". The bitmap decision signal may be sent directly to the RNC, or serving RNC (RNC). If the NodeB is connected to a drift RNC (DRNC), then the bitmap decision signal is sent to the SRNC via the DRNC. There are two types of frames: control frames and data frames. The technology disclosed herein may reuse the existing frames, and may add the new IE thereto, or may create a new control frame, dedicated to send the precoder selection, e.g., the bitmap decision signal.

The Iub/Iur data frames mentioned above may be frames in the Frame Protocol between RNC and NodeB. For example, the new IE may be added into the existing UL DATA FRAME FOR DCH/UL DATA FRAME FOR E-DCH TYPE 1/UL DATA FRAME FOR E-DCH TYPE 2. See, e.g., 3GPP TS 25.427 V11.0.0, incorporated herein by reference.

The existing Radio Interface Parameter Update [FDD] control frame may be modified so that it is sent from NodeB to RNC. Then the selection on this control frame may be transmitted, for example using 8 octets for the 64 bits, while each bits with value 1 indicating the selection of the code in order to achieve that the Precoding Weight Set Restriction is sent per carrier, carrier identity (like Radio Link ID, Cell ID, frequency or other) can be introduced.

For each cell, the precoding weight set restriction information may be sent by the RNC to the UE in the information element (IE) entitled "MIMO mode with four transmit antennas parameters" in the following RRC messages:

The ACTIVE SET UPDATE message, in case the UTRAN needs to add, replace or delete radio links in the active set of the UE.

The CELL UPDATE CONFIRM message, to confirm the cell update procedure. This message can also be used to reallocate new RNTI information for the UE valid in the new cell.

The PHYSICAL CHANNEL RECONFIGURATION message, which may be used by UTRAN to assign, replace or release a set of physical channels used by a UE.

The RADIO BEARER RECONFIGURATION message, which may be sent to the UE to reconfigure parameters related to a change of QoS or to release and setup a radio bearer used for point-to-point (ptp) transmission like MBMS services of the broadcast type. This radio bearer reconfiguration procedure can also change the multiplexing of MAC, reconfigure transport channels and physical channels. This message is also used to perform a handover from GERAN Iu mode to UTRAN.

The RADIO BEARER RELEASE message, which may be used by UTRAN to release a radio bearer. It can also include modifications to the configurations of transport channels and/or physical channels. It can simultaneously indicate release of a signalling connection when UE is connected to more than one CN domain.

The RADIO BEARER SETUP message, which may be sent by UTRAN to the UE to establish new radio bearer(s). It can also include modifications to the configurations of transport channels and/or physical channels.

The TRANSPORT CHANNEL RECONFIGURATION message, which may be used by UTRAN to configure the transport channel of a UE. This also includes a possible reconfiguration of physical channels. The message can also be used to assign a TFC subset and reconfigure physical channel The precoding weight set restriction information may also be included in the IE "MIMO mode with four transmit antennas parameters" in physical channel information "Target cell preconfiguration information" needed in the case of received Target cell HS-SCCH order. The configuration is shown in Table 4.

Second Example Embodiment

As a second example embodiment, the NodeB may directly communicate the changed precoding coodbook bitmap to the wireless terminal. Such communication may take the form of signaling in the physical layer. In this second example embodiment and mode the base station 28 thus becomes the node of the radio access network that sends the changed precoding codebook bitmap to the wireless terminal 30, and thus essentially does not involve the radio network controller (RNC) 26.

Figure 10A:
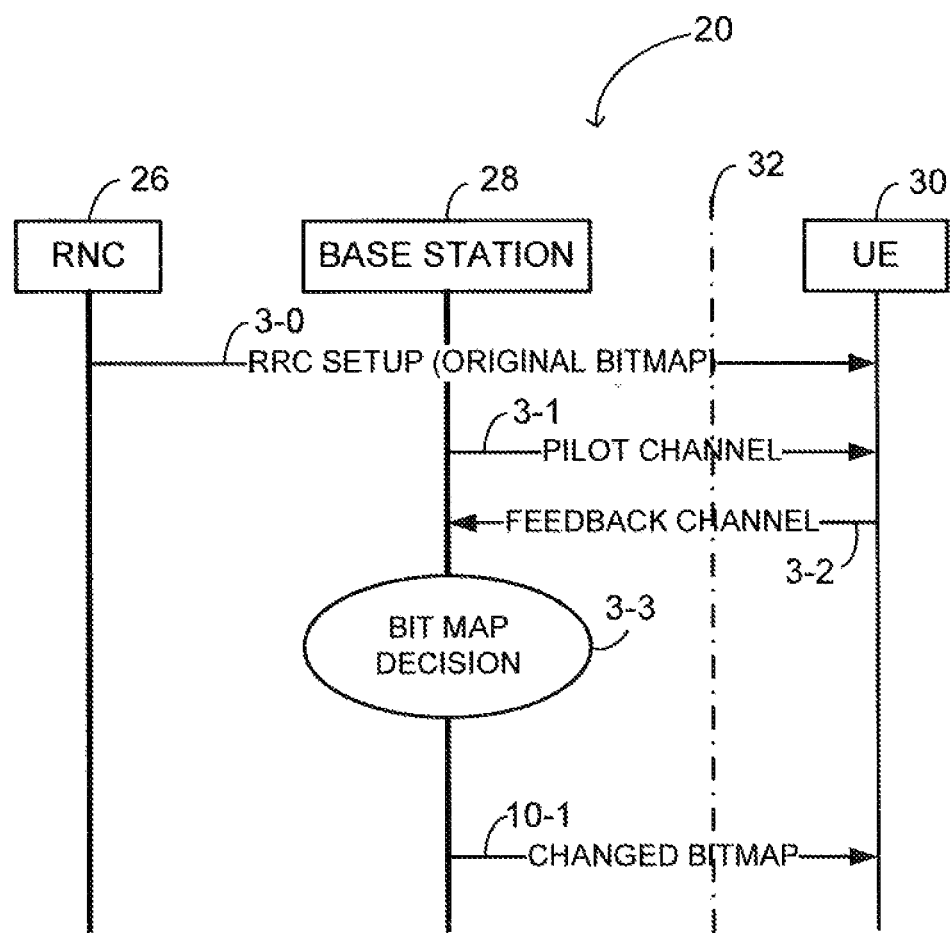
FIG. 10A is a schematic view of a telecommunications network suitable in which flexible codebook utilization may be implemented in a first example embodiment and mode of the technology disclosed herein.
Figure 10B:
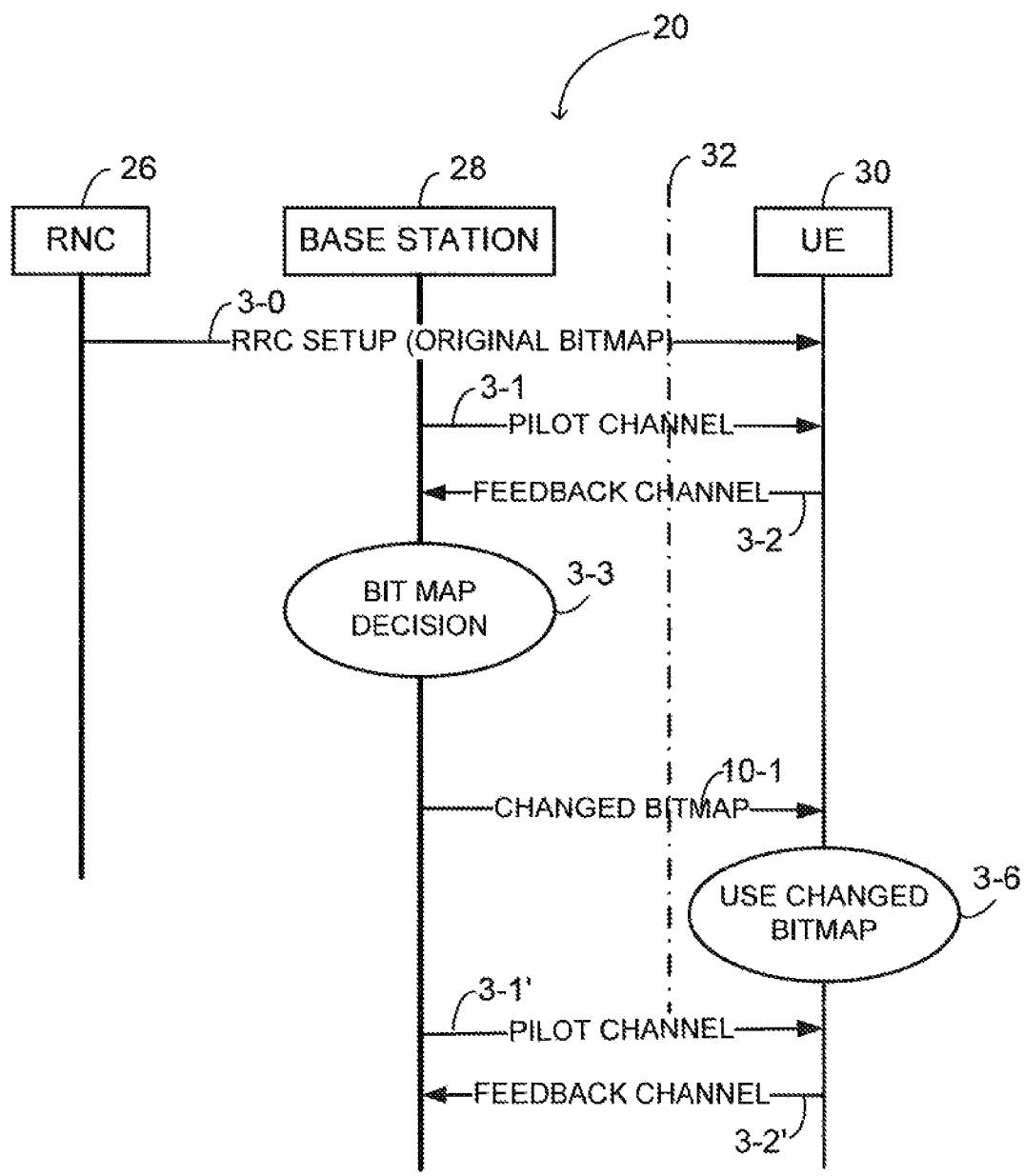
FIG. 10B is a diagrammatic view of an example message sequence similar to that of FIG. 10A, but further showing actions occurring after a changed bitmap is sent to a wireless terminal.
Figure 11:
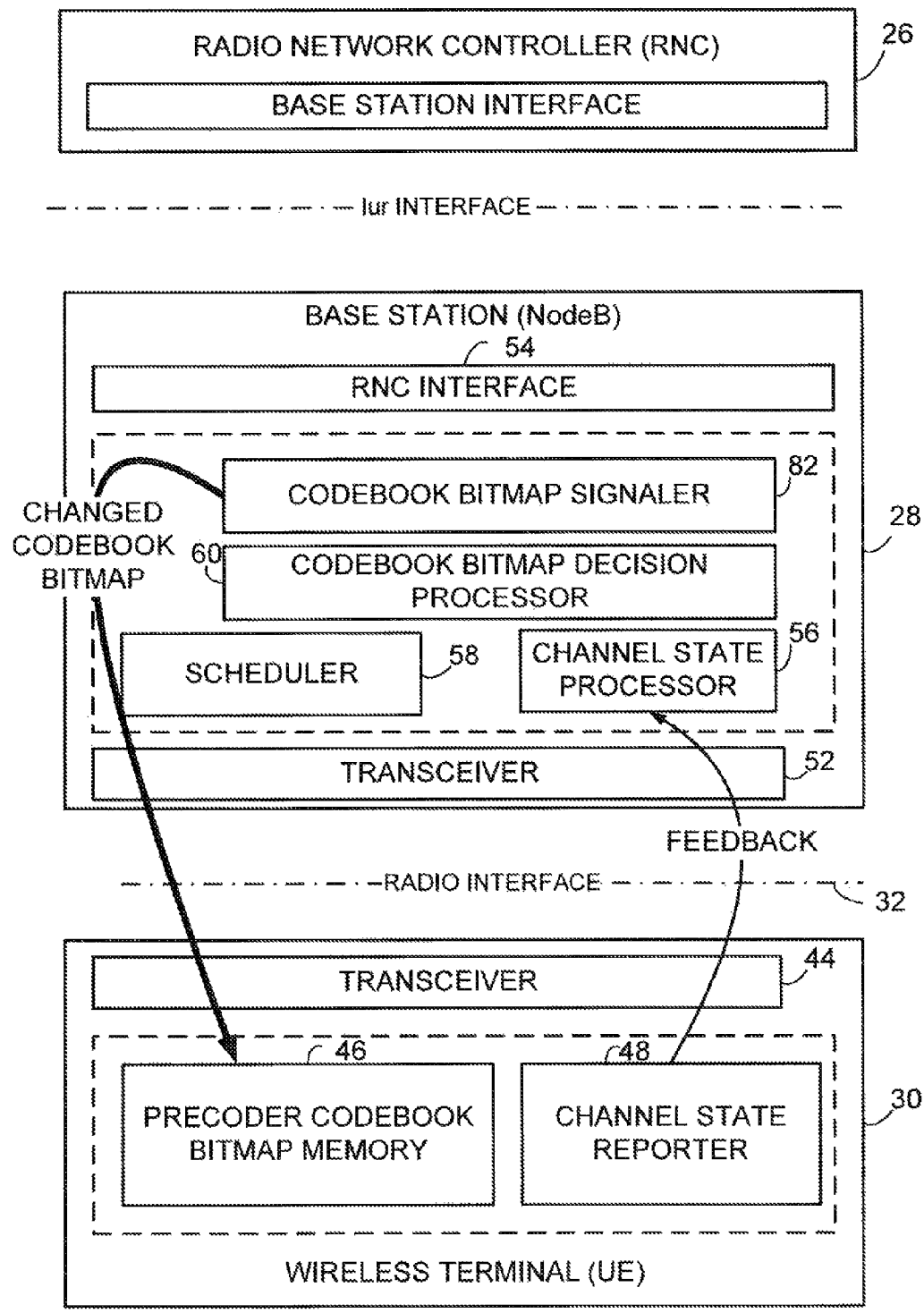
FIG. 11 is a schematic view of a telecommunications network suitable in which flexible codebook utilization may be implemented in a second example embodiment and mode of the technology disclosed herein.

Whereas FIG. 3A-FIG. 3B and FIG. 4 illustrate example acts and structure involved with the first example embodiment and mode, FIG. 10A-FIG. 10B and FIG. 11 illustrate comparable example acts and structure for the second example embodiment and mode. FIG. 10A-FIG. 10B and FIG. 11 employ like numbered/referenced elements and signals for acts and structures that are common to both the first example embodiment and the second example embodiment. A difference reflect by FIG. 10A and FIG. 10B, however, is that the changed precoding codebook bitmap is sent directly from the base station 28 to the wireless terminal 30 (as reflected by act 10-1), essentially without involving the radio network controller (RNC) 26. A difference reflected by FIG. 11 is that the base station 28 includes codebook bitmap signaler 82 which sends the changed precoding codebook bitmap to the wireless terminal 30. *

Example Network Structure

In example embodiments, functionalities including those of the RNC 26, base station 28, and wireless terminal 30, shown framed by a broken line in FIG. 4 and FIG. 11 may be realized using a machine platform. The terminology "platform" is a way of describing how the functional units may be implemented or realized by machine including electronic circuitry. One example platform is a computer implementation wherein one or more of the framed elements including are realized by one or more processors or controllers which execute coded instructions and which use non-transitory signals in order to perform the various acts described herein. In such a computer implementation the platform may further comprise, in addition to a processor(s), one or more memory sections (which in turn can comprise random access memory; read only memory; and application memory (which stores, e.g., coded instructions which can be executed by the processor to perform acts described herein); and any other memory such as cache memory, for example.

Typically the machine platforms also comprise other input/output units or functionalities, such as keypad; an audio input device (e.g. microphone); a visual input device (e.g., camera); a visual output device; and an audio output device (e.g., speaker). Other types of input/output devices can also be connected to or comprise the platform.

Another example platform suitable is that of a hardware circuit, e.g., an application specific integrated circuit (ASIC) wherein circuit elements are structured and operated to perform the various acts described herein.

As used herein, a "wireless terminal" can be a mobile station or user equipment unit (UE) such as a mobile telephone ("cellular" telephone) or a laptop with wireless capability (e.g., mobile termination), and thus can be, for example, a portable, pocket, hand-held, computer-included, or car-mounted mobile devices which communicates voice and/or data via a radio access network. Moreover, a wireless terminal can be a fixed terminal which communicates voice and/or data via a radio access network.

The technology disclosed herein provides numerous benefits and advantages, including but not limited to the following:

Flexibility in use of codebookSubsetRestriction by permitting the NodeB to choose its preferred precoding index, rank information.

Better link adaptation achievable with codebookSubsetRestriction.

Reduction of complexity at the wireless terminal in terms of CQI computation and avoidance of full search of a codebook.

Improved battery life for a wireless terminal (UE).

The following are example abbreviations, some of which may be utilized herein:
3GPP 3rd Generation Partnership Project
CCCH Common Control Channel
CFN Connection Frame Number
DCH Dedicated Channel
DL Downlink
E-DCH Enhanced Dedicated Channel
FACH Forward Access Channel
HS-DSCH High-Speed Downlink Shared Channel
H-RNTI HS-DSCH RNTI
MAC Medium Access Control Protocol
AM Acknowledged Mode
PDU Protocol Data Unit
RACH Random Access Channel
RNC Radio Network Controller
DRNC Drifting RNC
RRC Radio Resource Control Protocol
SDU Service Data Unit
RNTI Radio Network Temporary Identifier
SIB System Information Block
TEB S Total E-DCH Buffer Status
UE User Equipment
FDD Frequency Division Duplexing
UL Uplink
UTRA UMTS Terrestrial Radio Access
NODEB Base transceiver station
RNC Radio Network Controller
NBAP NodeB Application Part
RNSAP Radio Network Subsystem Application Part
DRX Discontinuous Reception
Iur The interface between RNCs in the same network
Iub The interface between the RNC and the NodeB
UE User Equipment Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

PHYSICAL SHARED CHANNEL RECONFIGURATION RESPONSE

| IE/Group Name | Presence | Range | IE Type and Reference | Semantics Description | Criticality | Assigned Criticality |
| --- | --- | --- | --- | --- | --- | --- |
| Message Discriminator | M | | 9.2.1.45 | | — | |
| Message Type | M | | 9.2.1.46 | | YES | Reject |
| Transaction ID | M | | 9.2.1.62 | | — | |
| Criticality Diagnostics | O | | 9.2.1.17 | | YES | Ignore |
| E-HICH Time Offset | O | | 9.2.3.59 | Applicable to 3.84 Mcps and 7.68 Mcps TDD only | YES | Reject |
| E-HICH Time Offset LCR per UARFCN | | 0 ... <maxFrequencyinCell> | | 1.28 Mcps TDD only. See note 1 below | EACH | Reject |
| >E-HICH Time Offset LCR | M | | 9.2.3.59a | | — | |
| >UARFCN | O | | 9.2.1.65 | Corresponds to Nt (TS 25.105 [15]) ... Mandatory for 1.28 Mcps TDD when using multiple frequencies. | — | |
| HS-DSCH Common System Information Response | O | | 9.2.2.77 | FDD only | YES | Ignore |
| HS-DSCH Paging System Information Response | O | | 9.2.2.78 | FDD only | YES | Ignore |
| Common E-DCH System Information Response | O | | 9.2.2.104 | FDD only | YES | Ignore |
| HS-DSCH Common System Information Response LCR | O | | 9.2.3.74 | 1.28 Mcps TDD only | YES | Ignore |
| HS-DSCH Paging System Information Response LCR | O | | 9.2.3.75 | 1.28 Mcps TDD only | YES | Ignore |
| Common E-DCH System Information Response LCR | O | | 9.2.3.80 | 1.28 Mcps TDD only | YES | Ignore |

TABLE 1-continued

PHYSICAL SHARED CHANNEL RECONFIGURATION RESPONSE

| IE/Group Name | Presence | Range | IE Type and Reference | Semantics Description | Criticality | Assigned Criticality |
|---|---|---|---|---|---|---|
| Preceding weight set restriction | O | | Precoding weight set restriction | FDD only | YES | Ignore |

Note 1
This information element is a simplified representation of the ASN.1. Repetition 1 and repetition 2 through maxFrequencyinCell are represented by separate ASN.1 structures with different criticalities.

TABLE 2

RADIO LINK SETUP RESPONSE (see following two pages)

| IE/Group Name | Presence | Range | IE Type and Reference | Semantics Description | Criticality | Assigned Criticality |
|---|---|---|---|---|---|---|
| Message Discriminator | M | | 9.2.1.45 | | — | |
| Message Type | M | | 9.2.1.46 | | YES | Reject |
| Transaction ID | M | | 9.2.1.62 | | — | |
| CRNC Communication Context ID | M | | 9.2.1.18 | The reserved value "All CRNCCC" shall not be used. | YES | Ignore |
| NodeB Communication Context ID | M | | 9.2.1.48 | The reserved value "All NBCC" shall not be used. | YES | Ignore |
| Communication Control Port ID | M | | 9.2.1.15 | | YES | Ignore |
| RL Information Response | | 1 ... <maxnoofRLs> | | | EACH | Ignore |
| >RL ID | M | | 9.2.1.53 | | — | |
| >RL Set ID | M | | 9.2.2.39 | | — | |
| >Received Total Wide Band Power | M | | 9.2.2.39A | | — | |
| >CHOICE Diversity Indication | M | | | | — | |
| >>Combining | | | | | | |
| >>>RL ID | M | | 9.2.1.53 | Reference RL ID for the combining | — | |
| >>Non Combining or First RL | | | | | | |
| >>>DCH Information Response | M | | 9.2.1.20C | | — | |
| >>>E-DCH FDD Information Response | O | | 9.2.2.13Db | | YES | Ignore |
| >Not Used | O | | NULL | | — | |
| >SSDT Support Indicator | M | | 9.2.2.46 | | — | |
| >DL Power Balancing Activation Indicator | O | | 9.2.2.12C | | YES | Ignore |
| >E-DCH RL Set ID | O | | RL Set ID 9.2.2.39 | | YES | Ignore |
| >E-DCH FDD DL Control Channel Information | O | | 9.2.2.13Dc | | YES | Ignore |
| >Initial DL DPCH Timing Adjustment | O | | DL DPCH Timing Adjustment 9.2.2.10A | | YES | Ignore |
| >HS-DSCH Preconfiguration Info | O | | 9.2.2.111 | | YES | Ignore |
| >Non-Serving RL Preconfiguration Info | O | | 9.2.2.145 | | YES | Ignore |
| >Precoding weight set restriction | O | | Precoding weight set restriction | | YES | Ignore |
| Criticality Diagnostics | O | | 9.2.1.17 | | YES | Ignore |
| HS-DSCH Information Response | O | | HS-DSCH FDD Information Response 9.2.2.18E | | YES | ignore |

TABLE 2-continued

RADIO LINK SETUP RESPONSE (see following two pages)

| IE/Group Name | Presence | Range | IE Type and Reference | Semantics Description | Criticality | Assigned Criticality |
|---|---|---|---|---|---|---|
| Continuous Packet Connectivity HS-SCCH less Information Response | O | | 9.2.2.69 | | YES | ignore |
| Additional HS Cell Information Response | | 0 ... <maxnoofHSDSCH-1> | | For secondary serving HS-DSCH cell. Max 7 in this 3GPP release. | EACH | ignore |
| >HS-PDSCH RL ID | M | | RL ID 9.2.1.53 | | — | |
| >HS-DSCH FDD Secondary Serving Information Response | M | | 9.2.2.18EA | | — | |
| Additional E-DCH Cell Information Response | | 0 ... <maxnoofEDCH-1> | | E-DCH on Secondary uplink frequency - max 1 in this 3GPP release | EACH | ignore |
| >Additional E-DCH FDD Information Response | M | | 9.2.2.135 | | — | |

TABLE 3

RADIO LINK PARAMETER UPDATE INDICATION

| IE/Group name | Presence | Range | IE Type and Reference | Semantic Description | Criticality | Assigned Criticality |
|---|---|---|---|---|---|---|
| Message Discriminator | M | | 9.2.1.45 | | — | |
| Message Type | M | | 9.2.1.46 | | YES | ignore |
| Transaction ID | M | | 9.2.1.62 | | — | |
| CRNC Communication Context ID | M | | 9.2.1.18 | The reserved value "All CRNCCC" shall not be used. | YES | ignore |
| HS-DSCH FDD Update Information | O | | 9.2.2.18Ea | | YES | ignore |
| E-DCH FDD Update Information | O | | 9.2.2.13DA | | YES | ignore |
| Additional HS Cell Information RL Param Upd | | 0 ... <maxnoofHSDSCH-1> | | For secondary serving HS-DSCH cell. Max 7 in this 3GPP release. | EACH | ignore |
| >HS-PDSCH RL ID | M | | RL ID 9.2.1.53 | | — | |
| >HS-DSCH FDD Secondary Serving Update Information | M | | 9.2.2.18Eaa | | — | |
| Additional E-DCH Cell Information RL Param Upd | | 0 ... <maxnoofEDCH-1> | | E-DCH on Secondary uplink frequency - max 1 in this 3GPP release. | EACH | ignore |
| >>Additional E-DCH FDD Update Information | M | | 9.2.2.138 | | — | |
| CPC Recovery Report | O | | ENUMERATED (Initiated, ...) | | YES | ignore |
| UL CLTD State Update Information | O | | 9.2.2.155 | | YES | ignore |
| Precoding weight set restriction | O | | Precoding weight set restriction | | YES | ignore |

TABLE 4

| Information Element/Group name | Need | Multi | Type and reference | Semantics description | Version |
|---|---|---|---|---|---|
| CHOICE Configuration info | MP | | | | REL-11 |
| >Continue | | | (no data) | Used in reconfigurations without interruption of MIMO mode with four transmit antennas. | REL-11 |
| >New configuration | | | | | REL-11 |
| >>MIMO mode with four transmit antennas N_cqi_typeA/M_cqi ratio | OP | | Enumerated (1/2, 2/3, 3/4, 4/5, 5/6, 6/7, 7/8, 8/9, 9/10, 1/1) | | REL-11 |
| >>MIMO mode with four transmit antennas pilot configuration | OP | | MIMO mode with four transmit antennas pilot configuration 10.3.6.41y | | REL-11 |
| >>Precoding weight set restriction | OP | | Bit string (64) | | REL-11 |

TABLE 5

The new IE is added in HS-DSCH Information Response IE and HS-DSCH FDD Secondary Serving Information Response IE which are included in RADIO LINK SETUP RESPONSE in NBAP 25.433

HS-DSCH FDD Information Response
The HS-DSCH Information Response provides information for HS-DSCH that have been established or modified. It also provides additional HS-DSCH information determined within the NodeB.

| IE/Group Name | Presence | Range | IE Type and Reference | Semantics Description | Criticality | Assigned Critically |
|---|---|---|---|---|---|---|
| HS-DSCH MAC-d Flow Specific Information Response | | 0 ... <maxnoofMACdFlows> | | | — | |
| >HS-DSCH MAC-d Flow ID | M | | 9.2.1.31I | | — | |
| >Binding ID | O | | 9.2.1.4 | | — | |
| >Transport Layer Address | O | | 9.2.1.63 | | — | |
| >HS-DSCH Initial Capacity Allocation | O | | 9.2.1.31Ha | | — | |
| HS-SCCH Specific Information Response | | 0 ... <maxnoofHSSCCHcodes> | | | — | |
| >Code Number | M | | INTEGER (0 ... 127) | | — | |
| HARQ Memory Partitioning | O | | 9.2.1.102 | | — | |
| HARQ Preamble Mode Activation Indicator | O | | 9.2.2.18b | | YES | ignore |
| MIMO N/M Ratio | O | | 9.2.2.96 | | YES | ignore |
| SixtyfourQAM DL Usage Indicator | O | | 9.2.2.74B | | YES | ignore |
| HS-DSCH TB Size Table Indicator | O | | 9.2.2.18Ee | | YES | ignore |
| Support of dynamic DTXDRX related HS-SCCH order | O | | 9.2.2.150 | | YES | ignore |
| Precoding weight set restriction | O | | Precoding weight set restriction | | YES | Ignore |

| Range Bound | Explanation |
|---|---|
| maxnoofMACdFlows | Maximum number of HS-DSCH MAC-d flows |
| maxnoofHSSCCHcodes | Maximum number of HS-SCCH codes |

HS-DSCH FDD Secondary Serving Information Response
The HS-DSCH Secondary Serving Information Response provides information for Secondary Serving HS-DSCH that have been established or modified. It also provides additional HS-DSCH information determined within the NodeB.

| | | | IE Type and | Semantics | | Assigned |

TABLE 5-continued

The new IE is added in HS-DSCH Information Response IE and HS-DSCH FDD Secondary Serving Information Response IE which are included in RADIO LINK SETUP RESPONSE in NBAP 25.433

| IE/Group Name | Presence | Range | Reference | Description | Criticality | Critically |
|---|---|---|---|---|---|---|
| HS-SCCH Specific Secondary Serving Information Response | | 0 ... <maxnoofHSSCCHcodes> | | | | |
| >Code Number | M | | INTEGER (0 ... 127) | | | |
| SixtyfourQAM DL Usage Indicator | O | | 9.2.2.74B | | | |
| HS-DSCH TB Size Table Indicator | O | | 9.2.2.18Ee | | | |
| MIMO N/M Ratio | O | | 9.2.2.96 | | YES | ignore |
| Precoding weight set restriction | O | | Precoding weight set restriction | | YES | Ignore |

| Range Bound | Explanation |
|---|---|
| maxnoofHSSCCHcodes | Maximum number of HS-SCCH codes |

TABLE 6

The new IE is added in HS-DSCH FDD Update Information IE and HS-DSCH FDD Secondary Serving Update Information IE which are included in RADIO LINK PARAMETER UPDATE INDICATION in NBAP 25.433

HS-DSCH FDD Secondary Serving Information Response
The HS-DSCH Secondary Serving Information Response provides information for Secondary Serving HS-DSCH that have been established or modified. It also provides additional HS-DSCH information determined within the NodeB.

| IE/Group Name | Presence | Range | IE Type and Reference | Semantics Description | Criticality | Assigned Critically |
|---|---|---|---|---|---|---|
| HS-SCCH Specific Secondary Serving Information Response | | 0 ... <maxnoofHSSCCHcodes> | | | | |
| >Code Number | M | | INTEGER (0 ... 127) | | | |
| SixtyfourQAM DL Usage Indicator | O | | 9.2.2.74B | | | |
| HS-DSCH TB Size Table Indicator | O | | 9.2.2.18Ee | | | |
| MIMO N/M Ratio | O | | 9.2.2.96 | | YES | ignore |
| Precoding weight set restriction | O | | Precoding weight set restriction | | YES | Ignore |

| Range Bound | Explanation |
|---|---|
| maxnoofHSSCCHcodes | Maximum number of HS-SCCH codes |

HS-DSCH FDD Secondary Serving Update Information
The HS-DSCH FDD Secondary ServingUpdate Information IE provides information for Secondary Serving HS-DSCH to be updated. At least one IE shall be present.

| IE/Group Name | Presence | Range | IE Type and Reference | Semantics Description | Criticality | Assigned Criticality |
|---|---|---|---|---|---|---|
| HS-SCCH Code Change Indicator | O | | 9.2.1.31K | | | |
| HS-PDSCH Code Change Indicator | O | | 9.2.1.31M | This IE shall never be included. If received it shall be ignored. | | |
| Precoding weight set restriction | O | | Precoding weight set restriction | | YES | Ignore |

What is claimed is:

1. A base station of a radio access network comprising:
an interface configured for wireless communications with a wireless terminal served by the base station; and
a processor configured to:
make a determination to change a precoding codebook bitmap used by the wireless terminal to report parameters to the base station; and
as a result of the determination, send a bitmap decision signal indicating a changed precoding codebook bitmap for the wireless terminal;
wherein the processor is configured to send the bitmap decision signal by including the bitmap decision signal in a precoder weight set restriction information element in a high speed downlink shared channel (HS-DSCH) frequency division duplex (FDD) information element in a radio link message.

2. The base station of claim 1, wherein the processor is configured to include the precoder weight set restriction information element in at least one of the following messages:
NBAP/RNSAP "RADIO LINK SETUP RESPONSE message;
RADIO LINK ADDITION RESPONSE message;
RADIO LINK RECONFIGURATION READY message; and
RADIO LINK RECONFIGURATION RESPONSE message.

3. The base station of claim 2, wherein the processor is configured to include the precoder weight set restriction information element in at least one of the following messages:
HS-DSCH Information Response message; and
HS-DSCH FDD Secondary Serving Information Response message.

4. The base station of claim 2, wherein the processor is configured to include the precoder weight set restriction information element in a RADIO LINK PARAMETER UPDATE INDICATION message.

5. A method in a base station of a radio access network which is in wireless communication with a wireless terminal served by the base station, the method comprising:
making a determination to change a precoding codebook bitmap used by the wireless terminal to report parameters to the base station; and
as a result of the determination, sending a bitmap decision signal that indicates a changed precoding codebook bitmap for the wireless terminal;
wherein sending the bitmap decision signal comprises including the bitmap decision signal in a precoder weight set restriction information element in a high speed downlink shared channel (HS-DSCH) frequency division duplex (FDD) information element in a radio link message.

6. The method of claim 5, wherein the radio link message comprises at least one of the following messages:
NBAP/RNSAP "RADIO LINK SETUP RESPONSE message;
RADIO LINK ADDITION RESPONSE message;
RADIO LINK RECONFIGURATION READY message; and
RADIO LINK RECONFIGURATION RESPONSE message.

7. The method of claim 5, further comprising including the precoder weight set restriction information element in at least one of the following messages:
HS-DSCH Information Response message; and
HS-DSCH FDD Secondary Serving Information Response message.

8. The method of claim 5, further comprising including the precoder weight set restriction information element in a RADIO LINK PARAMETER UPDATE INDICATION message.

* * * * *